United States Patent [19]

Childress et al.

[11] Patent Number: 4,905,302

[45] Date of Patent: Feb. 27, 1990

[54] TRUNKED RADIO REPEATER SYSTEM

[75] Inventors: Jeffrey S. Childress, Lynchburg; Marc A. Dissosway, Forest; Gerald M. Cooper, Gretna; Houston H. Hughes, III, Lynchburg, all of Va.

[73] Assignee: General Electric Company, Lynchburg, Va.

[21] Appl. No.: 56,922

[22] Filed: Jun. 3, 1987

[51] Int. Cl.$^4$ .......................... H04B 7/24; H04Q 7/04
[52] U.S. Cl. ........................................ 455/34; 455/38; 455/54; 455/58; 340/825.5
[58] Field of Search ...................... 455/32, 34, 38, 49, 455/53, 54, 56, 58, 7, 11, 17; 340/825.48, 825.44, 825.5, 825.51; 379/58, 59, 60, 63

[56] References Cited

U.S. PATENT DOCUMENTS

| | | |
|---|---|---|
| 3,292,178 | 12/1966 | Magnuski . |
| 3,458,664 | 7/1969 | Adlhoch et al. . |
| 3,571,519 | 3/1971 | Tsimbidis . |
| 3,696,210 | 10/1972 | Peterson et al. . |
| 3,801,956 | 4/1974 | Braun et al. . |
| 3,898,390 | 8/1975 | Wells et al. .................. 455/34 X |
| 3,906,166 | 9/1975 | Cooper et al. . |
| 3,936,616 | 2/1976 | DiGianfilippo et al. . |
| 3,970,801 | 7/1976 | Ross et al. . |
| 4,001,693 | 5/1977 | Stackhouse et al. . |
| 4,010,327 | 3/1977 | Kobrinetz . |
| 4,012,597 | 3/1977 | Lynk, Jr. et al. . |
| 4,022,973 | 5/1977 | Stackhouse . |
| 4,027,243 | 5/1977 | Stackhouse et al. . |
| 4,029,901 | 6/1977 | Campbell . |
| 4,128,740 | 12/1978 | Graziano . |
| 4,131,849 | 12/1978 | Freeburg et al. . |
| 4,184,118 | 1/1980 | Cannalte et al. . |
| 4,231,114 | 10/1980 | Dolikian . |
| 4,267,593 | 5/1981 | Craiglow . |
| 4,309,772 | 1/1982 | Kloker et al. . |
| 4,312,070 | 1/1982 | Coombes et al. . |

(List continued on next page.)

FOREIGN PATENT DOCUMENTS 0102836  5/1986  Japan ..................................... 455/54

OTHER PUBLICATIONS

Federal Information Processing Standards, Pub. No. 46, Data Encryption Standard, U.S. Dept. of Comm., NTIS, (5285 Port Royal Rd., Springfield, VA 22161).
"Voice and Data Transmission", Arrendondo, Teggeler and Smith, Bell Systems Technology Journal, vol. 58, No. 1, Jan. 1978, pp. 97–122.

Primary Examiner—Robert L. Griffin
Assistant Examiner—Ralph Smith
Attorney, Agent, or Firm—Nixon & Vanderhye

[57] ABSTRACT

A digitally trunked radio repeater system provides substantial improvements in timeliness of channel acquisition and channel drop, and in reliability of critical control signalling. The system uses a much higher digital signalling rate than is typically found in prior art systems, and uses a control channel to convey digital channel request and assignment messages between the central site and mobile transceivers. The mobile radio transceivers transmit channel requests on the control channel (if no response is received, the mobile retries during a retry time window which increases in duration in dependence on the number of retries). The mobile transceiver switches to a working channel in response to an assignment message received on the control channel. Subaudible digital signals transmitted on the control channel and on active working channels allow late entry, shifting to higher priority calls, and other advanced functions. Message and transmission trunking capabilities are both present so as to maximize working channel usage without compromising channel access for high priority communications. During transmission trunking, called and calling transceivers return to the control channel after each transmission (and called transceivers may be inhibited from transmitting) but grant higher priority to calls from the other transceivers being communicated with to ensure continuity over an entire conversation. Additional functions and fault tolerant features further increase the versatility and reliability of the system.

82 Claims, 11 Drawing Sheets

U.S. PATENT DOCUMENTS

| | | |
|---|---|---|
| 4,312,074 | 1/1982 | Pautler et al. . |
| 4,322,576 | 3/1982 | Miller . |
| 4,326,264 | 4/1982 | Cohen et al. . |
| 4,339,823 | 7/1982 | Predina et al. . |
| 4,347,625 | 8/1982 | Williams . |
| 4,360,927 | 11/1982 | Bowen et al. . |
| 4,369,443 | 1/1983 | Giallanza et al. . |
| 4,382,298 | 5/1983 | Evans . |
| 4,392,242 | 7/1983 | Kai ................................. 455/34 X |
| 4,400,585 | 8/1983 | Kamen et al. . |
| 4,409,687 | 10/1983 | Berti et al. . |
| 4,418,425 | 11/1983 | Fennel, Jr. et al. . |
| 4,430,742 | 2/1984 | Milleker et al. . |
| 4,430,755 | 2/1984 | Nadir et al. . |
| 4,433,256 | 2/1984 | Dolikian . |
| 4,434,323 | 2/1984 | Levine et al. . |
| 4,450,573 | 5/1984 | Noble . |
| 4,485,486 | 11/1984 | Webb et al. . |
| 4,534,061 | 8/1985 | Ulug ..................................... 455/17 |
| 4,578,815 | 3/1986 | Persinotti . |
| 4,649,567 | 3/1987 | Childress ......................... 455/34 X |
| 4,658,435 | 4/1987 | Childress et al. ..................... 455/17 |
| 4,663,765 | 5/1987 | Sutphin .................................. 375/5 |
| 4,694,473 | 9/1987 | Etoh ..................................... 379/63 |
| 4,698,805 | 10/1987 | Sasuta et al. . |
| 4,716,407 | 12/1987 | Borras et al. ................. 340/825.5 X |
| 4,723,264 | 2/1988 | Sasuta et al. ......................... 379/63 |
| 4,757,536 | 7/1988 | Szczutkowski ...................... 380/48 |
| 4,771,448 | 9/1988 | Koohgoli .............................. 379/63 |
| 4,811,420 | 3/1989 | Avis et al. ............................ 379/63 |

CALLING

| | MIN(msec) | TYP(msec) | MAX*(msec) |
|---|---|---|---|
| $t_s$ = TIME TO SYNC & START TX | 20 | 35 | 50 |
| $t_{tx}$ = TX TIME | 30 | 30 | 30 |
| $t_w$ = WAIT TIME | 60 | 60 | 90 |
| $t_{ca}$ = CHANNEL ASSIGNMENT TIME | 30 | 30 | 30 |
| $t_{wc}$ = TIME TO WORKING CHANNEL | 15 | 20 | 25 |
| $t_c$ = TIME TO CONFIRMATION | 15 | 15 | 45 |
| $t_{cd}$ = TIME BETWEEN CONFIRMATION & DOTTING | 20 | 20 | 25 |
| $t_d$ = TIME FOR SENDING DOTTING | 60 | 60 | 60 |
| $t_u$ = TIME TO UNMUTE | 0 | 10 | 30 |
| | 250 | 280 | 385 |

*MAXIMUM ASSUMING SUCCESS

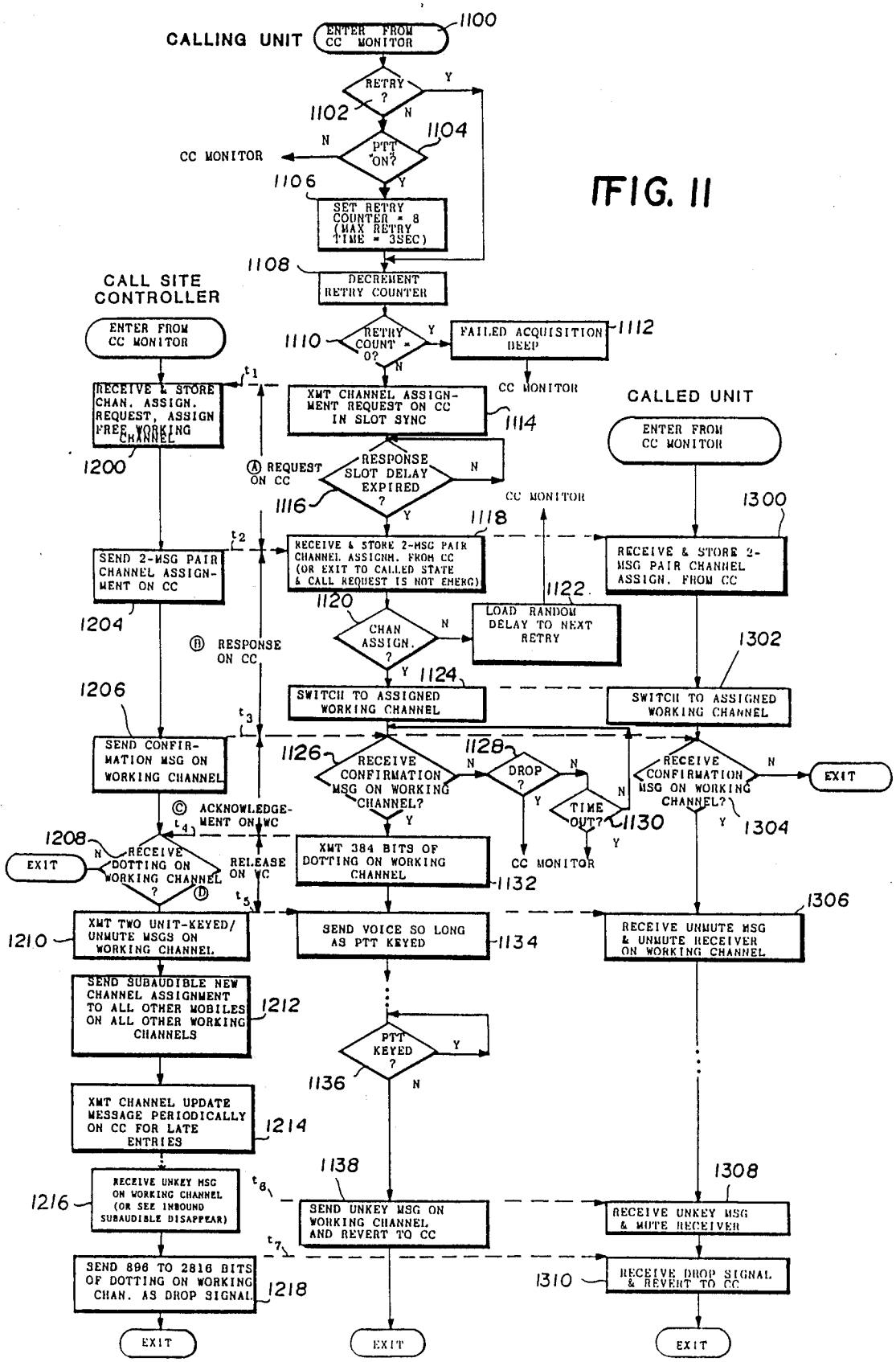

TRUNKED RADIO REPEATER SYSTEM

BACKGROUND AND SUMMARY OF THE INVENTION

This invention is generally directed to the art of trunked radio repeater systems. It is more particularly directed to such systems using digital control signals transmitted over a dedicated control channel while also using plural working channels which are assigned temporarily for use by individual radio units.

The trunking of radio repeaters is well-known. Early trunking systems used analog control signals while some more recent systems have utilized digital control signals. Control signals have been utilized on a dedicated control channel and/or on different ones of the working channels for various diferent reasons and effects. A non-exhaustive but somewhat representative sampling of prior art publications and patents describing typical prior art trunked radio repeater systems is identified below:

U.S. Pat. No. 3,292,178—Magnuski (1966)
U.S. Pat. No. 3,458,664—Adlhoch et al (1969)
U.S. Pat. No. 3,571,519—Tsimbidis (1971)
U.S. Pat. No. 3,696,210—Peterson et al (1972)
U.S. Pat. No. 3,906,166—Cooper et al (1975)
U.S. Pat. No. 3,936,616—DiGianfilippo (1976)
U.S. Pat. No. 3,970,801—Ross et al (1976)
U.S. Pat. No. 4,001,693—Stackhouse etal (1977)
U.S. Pat. No. 4,010,327—Kobrientz et al (1977)
U.S. Pat. No. 4,012,597—Lynk, Jr. et al (1977)
U.S. Pat. No. 4,022,973—Stackhouse etal (1977)
U.S. Pat. No. 4,027,243—Stackhouse etal (1977)
U.S. Pat. No. 4,029,901—Campbell (1977)
U.S. Pat. No. 4,128,740—Graziano (1978)
U.S. Pat. No. 4,131,849—Freeburg et al (1978)
U.S. Pat. No. 4,184,118—Cannalte et al (1980)
U.S. Pat. No. 4,231,114—Dolikian (1980)
U.S. Pat. No. 4,309,772—Kloker et al (1982)
U.S. Pat. No. 4,312,070—Coombes et al (1982)
U.S. Pat. No. 4,312,074—Pautler et al (1982)
U.S. Pat. No. 4,326,264—Cohen et al (1982)
U.S. Pat. No. 4,339,823—Predina et al (1982)
U.S. Pat. No. 4,347,625—Williams (1982)
U.S. Pat. No. 4,360,927—Bowen et al (1982)
U.S. Pat. No. 4,400,585—Kamen et al (1982)
U.S. Pat. No. 4,409,687—Berti et al (1983)
U.S. Pat. No. 4,430,742—Milleker et al (1984)
U.S. Pat. No. 4,430,755—Nadir et al (1984)
U.S. Pat. No. 4,433,256—Dolikian (1984)
U.S. Pat. No. 4,450,573—Noble (1984)
U.S. Pat. No. 4,485,486—Webb et al (1984)
U.S. Pat. No. 4,578,815—Persionotti (1985)

Bowen et al is one example of prior art switched channel repeater systems which avoid using a dedicated control channel—in part by providing a handshake with the repeater site controller on a seized "idle" working channel before communication with the called unit(s) is permitted to proceed.

There are many actual and potential applications for trunked radio repeater systems. However, one of the more important applications is for public service trunked (PST) systems. For example, one metropolitan area may advantageously utilize a single system of trunked radio repeaters to provide efficient radio communications between individual radio units within many different agencies. Each agency may, in turn, achieve efficient communication between individual units of different fleets of sub-units (e.g., the police department may have a need to provide efficient communications between different units of its squad car force, different portable units assigned to foot patrolmen, different units of detectives or narcotics agents and the like). Sometimes it may be important to communicate simultaneously to predefined groups of units (e.g., all units, all the squad cars, all of the foot patrolmen, etc.). At the same time, other agencies (e.g., the fire department, the transportation department, the water department, the emergency/rescue services, etc.) may be in need of similar communication services. As is well-known to those familiar with trunking theory, a relatively small number of radio repeaters can efficiently service all of these needs within a given geographic area if they are trunked (i.e., shared on an "as-needed" basis between all potential units).

This invention also is especially adapted for special mobile radio (SMR) trunked users. Here, an entrepreneur may provide a trunked radio repeater system at one or more sites within a given geographic area and then sell air time to many different independent businesses or other entities having the need to provide efficient radio communication between individual units of their particular organization. In many respects, the requirements of an SMR user are similar to those of a PST user.

In fact, the potential advantages of trunked radio repeater systems for public services is so well recognized that an organization known as the Association of Public-Safety Communications Officers, Inc. (formerly the Association of Police Communications Officers) (APCO) has developed a set of highly desirable features for such a system commonly known as the "APCO-16 Requirements." A complete listing and explanation of such requirements may be found in available publications known to those in the art.

One of the APCO-16 requirements is that any user must have voice channel access within one-half second after engaging a push-to-talk (PTT) switch. This same requirement must especially be met in emergency situations—and that implies that the system must be able to actively drop lower priority users also within a very short time frame. And, of course, the ability to quickly and efficiently drop channel assignments as soon as channel usage is terminated is also important for efficient usage of the trunked facility even in non-emergency situations.

Prior trunked radio systems have attempted to more or less "just meet" such APCO-16 requirements of timeliness. For example, published specifications of one such prior system indicates an ability to achieve channel update (in a 19 channel system) within 450 milliseconds and channel drops within 500 milliseconds. To achieve this, it utilizes 3,600 bits per second (bps) digital signalling over a dedicated digital control channel. Unfortunately, although theoretically the APCO-16 requirements of timeliness should be met by such a prior system, in reality, the APCO-16 timeliness requirements are often not met—or, are met only at the expense of suffering with the obviously adverse effects of somewhat unreliable digital control signalling (which are, at best, annoying even in non-emergency situations). Accordingly, there is considerable room for improvement.

The present invention provides substantial improvements—both in timeliness and in reliability of critical control signalling in a digitally trunked radio system of this general type. To begin with, a much higher digital signalling rate (9600 bps) is utilized. However, rather than using all of the increased signalling rate to provide a 9600/3600=2.67 improvement factor in timeliness, a large portion of the increased signalling rate capacity is utilized to improve signalling reliability. Accordingly, the increased timeliness of 19 channel updating capability, for example, is improved by a factor of approximately 1.58 (e.g. 285 milliseconds versus 450 milliseconds) while the rest of the increased signalling capacity is utilized to increase the reliability of control signalling. At the same time, virtually all of the increased signalling capacity is utilized to improve the timeliness of channel drop ability (e.g., 190 milliseconds versus 500 milliseconds).

As previously demonstrated by Bell System Technical Journal articles on the AMPS system (e.g. "Voice and Data Transmission", by Arredondo et al, The Bell System Technical Journal, Vol. 58, No. 1, January 1979, pp 97-122), digital data rates on radio channels should be either very low (e.g., 200 hertz) or as high as the channel bandwidth permits. The present invention utilizes the maximum high speed data rates (e.g., 9600 bps on the typical 25 KHz bandwidth radio channel) for critical control channel signalling and control signalling on the working channels both immediately before and immediately after the user communication interval. In addition, sub-audible low-speed digital data is also utilized on the working channel during user communications so as to assure additional signalling reliability—and to also permit implementation of additional features.

In the exemplary embodiment, all channels (the control as well as working channels) are fully duplexed so that there may be simultaneous in-bound and out-bound signalling on all channels. In general, this invention achieves reliable and prompt communication within a trunked radio repeater system having a digital control channel and plural working channels, which working channels are assigned for temporary use by individual radio units as specified by digital control signals on the control channel.

Channel assignment is initially requested by a calling radio unit passing digital request signals to a control site over the active control channel. In accordance with channel availability, a controller at the central site assigns a specific then-available working channel to the requested communication and passes digital assignment signals out-bound over the control channel. Both the calling radio unit and the called unit(s) detect the working channel assignment and switch their transmitter and receiver operations over to the proper working channel. Thereafter, digital handshake signals are again exchanged between the control site and at least one of the radio units (e.g., the calling unit) over the assigned working channel. In response to a successful handshake on the assigned working channel, the central site then transmits digital release signals over the assigned working channel so as to release the appropriate units for communication thereover.

As one technique for increasing reliability, the initial request signals may include three-fold data redundancy (at least for critical data) while the channel assignment signals subsequently transmitted over the control channel may include as much as six fold redundancy of data (e.g, at least of critical data such as that representing the called party and the assigned channel). The handshake signals subsequently exchanged on the assigned working channel may also include three-fold data redundancy of at least critical data. In this manner, some of the increased signalling capacity made available by the high-speed data rate (e.g., 9600 bps) is sacrificed in favor of more reliable channel allocation and communication functions—while still comfortably exceeding all APCO-16 requirements.

To insure responsiveness to higher priority calls, sub-audible digital channel assignment update messages are also transmitted over the assigned working channel. These are monitored in each unit then residing on the working channels. Accordingly, if a higher priority call is directed to some unit already engaged in a communication, that unit is enabled to promptly switch operations to a new assigned working channel so as to immediately receive the higher priority call.

In addition, to accommodate late entry of called parties to an ongoing communication, digital channel assignment "late entry" messages continue to be transmitted on the control channel even after a successful channel assignment process has been effected so that late entrats (e.g., those just turning on their radio, just passing out of a tunnel or from behind a building or otherwise back into radio communication after temporary interruption, completion of a higher or equal priority call, etc.) may nevertheless be switched onto the proper assigned working channel as soon as possible. (The late entry feature, per se, is related to copending commonly assigned application Ser. No. 725,682, now U.S. Pat. No,. 4,649,567, filed 22 Apr. 1985.)

To effect prompt and reliable termination of channel assignments, when the PTT switch of a calling unit is released, it sends a digital unkeyed message on the assigned working channel and, in response to reception of this unkeyed message at the control site, a digital drop signal is transmitted over the assigned working channel so as to immediately drop all units therefrom and thus free that working channel for reassignment. (As will be appreciated, a given radio unit will automatically revert to monitoring the control channel upon dropping from an assigned working channel.)

The system of this invention is sometimes termed a "digitally" trunked system because trunking control is effected by digital signals passed over a continuously dedicated "control" data channel. All units are programmed so as to automatically revert to the predetermined primary control channel upon being turned on or being reset. If the expected control channel data format is not there discovered, then alternate possible control channels are successively monitored in a predetermined sequence until an active control channel is discovered. In this manner, the usual control channel apparatus at the central control site may be temporarily removed from service (e.g., for maintenance purposes). This same feature also permits continued trunked system operation in the event that the regular control channel unexpectedly malfunctions or is otherwise taken out of service.

The exemplary embodiment of this invention is designed in such a way that it meets and, in many areas, surpasses all of the existing APCO-16 requirements. It may also support available voice encryption techniques, mobile digital data terminals (digital data may be passed in lieu of analog voice data during a trunked radio communication session) and/or available automatic vehicular location systems. Preferably, a fault tolerant architecture is used [see related copending commonly assigned application Ser. No. 057,046, filed concurrently herewith] so as to maintain trunked system operation even if the central processor happens to fail at the control site. If digital data is to be communicated between radio units and/or the central site, then it may be processed through the system in a manner similar to analog voice signals. In particular, such digital data communication will be carried out at a rate accommodated within the existing audio pass band and will be trunked just like desired voice communications (i.e., no dedicated digital data communication channels are required). To help increase reliability of digital data communications, data transmissions (and analog voice transmissions, as well) may be voted in voting systems employing satellite receivers connected to the central control site.

In the exemplary embodiment, digital control signalling messages of the following types are utilized:

| Channel Type | Direction | Rate |
|---|---|---|
| Control Channel | INBOUND<br>Group Call<br>Special Call<br>Status<br>Status Request/Page<br>Emergency Alert/Group Call<br>Individual Call<br>Cancel Dynamic Regroup<br>Dynamic Regroup - Forced Select<br>Dynamic Regroup - Option Deselect<br>Dynamic Regroup - Option Select<br>Login/Dynamic Regroup Acknowledge<br>Logical ID Request<br>Programming Request | 9600 pbs |
| | OUTBOUND<br>Channel Assignment<br>Channel Update<br>Enable/Disable Unit<br>Dynamic Regroup<br>Preconfiguration<br>Alias ID<br>Unit Keyed/Unkeyed<br>Emergency Channel Assignment<br>Cancel Dynamic Regroup<br>Dynamic Regroup - Forced Select<br>Dynamic Regroup - Optional Select<br>Dynamic Regroup - Optional Select<br>Assign Group ID An Alias ID<br>Assign Logical ID An Alias ID<br>Status Acknowledge/Page<br>Time Mark<br>Emergency Channel Update<br>Site ID<br>System Operationa Made<br>Site Status<br>Logical ID Assignment<br>Programming Channel Assignment | 9600 bps |
| Working Channel | INBOUND<br>Initial Handshake<br>Special Call Signalling<br>Unit ID-PTT and Reverse PTT<br>Miscellaneous | 9600 bps |
| | OUTBOUND<br>Initial handshake<br>Channel Drop<br>Status Messages | 9600 bps |
| | INBOUND<br>Confirm Unit PTT | Low Speed |
| | OUTBOUND<br>Priority Scan<br>Falsing Prevention | Low Speed |

Some of the general features of the exemplary embodiment and expected benefits are summarized below:

| FEATURE | BENEFIT |
|---|---|
| VERY SHORT AVERAGE CHANNEL ACCESS TIME | Practically instantaneous access doesn't cut off syllables |
| Normal Signal Strength Areas: 280 Milliseconds Weak Signal Areas (12dB Sinad: 500 Milliseconds | Provides operation which is faster than most coded squelch systems. |
| LATE ENTRY Should a mobile turn on during the period in which its group is involved in a conversation, the mobile will automatically be directed to join that conversation. | Minimizes missed conversations, keeps police up to the minute, minimizes call backs. |
| AUTOMATIC CHANNEL SWITCHING Mobiles, portables, control stations, and consoles automatically switch to the appropriate channel. | Frequency coordination of the fleets and subfleets requires no action on the part of any field personnel. |
| HIGH SPEED CALL PROCESSING Processor assigns unit initiating the call, and all called units, to an appropriate working channel. Initial channel assignment communication between site controller and radio units occurs on the control channel. | Dedicated control channel provides more rapid channel assignments on larger systems. System size does not impact upon channel acquisition time. Control channel is available for additional functions such as status and unit ID. |
| CALL RETRY Calling unit will automatically repeat its request up to eight times if no response is received. Retries terminated upon system response. | Eliminates the need for repetitive PTT operations by the operator in weak signal situations. Terminating retries also shortens the signalling time. |
| UNIT DISABLE Trunked units can be disabled on an individual basis. These disabled units continue to monitor the control channel and can be polled to determine their status. | In hostage situations, these units can be assigned to a special group for communication with the criminals. Also, with automatic vehicular location, these units could be tracked for apprehension. |
| SUPPLEMENTARY CONTROL CHANNEL FUNTIONALITY In addition to providing channel assignments, the control channel is used for: status messages, polling, system status, logging, late entry, dynamic regrouping, system testing and other system functions. | Provides user and system operator with system manager features not available on other types of systems. |
| GROUP PRIVACY Each group hears only his own group, unless specifically programmed otherwise. Dispatcher can override for individual units or groups of mobiles at any time. | Each group has the same privacy as having their own channel with the additional benefits of being regrouped with other complementing functions for emergency operations. |
| CALL QUEUING When all channels are busy, call requests will be queued until a channel | Maintains orderly entry procedure for busy system. Call requests are accep- |

| FEATURE | BENEFIT |
|---|---|
| becomes available. Unit requesting a channel will be notified to prevent call backs. Members of groups already in the queue will not be reentered in the queue. | ted in the order they are received except higher priority users go to the head of the line. |
| DATA COMMUNICATIONS System has the optional capability of using 9600 bps data on the working channels. Data communications will take place on any equipped working channel and they are trunked, just as voice communication. | This feature greatly enhances the value of the system because it avoids the expense of additional RF channels. |
| VOICE ENCRYPTION System has the optional capability of using available 9600 baud voice encryption. (See, e.g. commonly assigned US U.S. Pat. No. 4,622,680 and application Serial Nos. 661,597 filed 17 October 1984, 661,733 filed 17 October 1984 and 661,740 filed 17 October 1984.) | Voice encryption offers the same encrypted range as for clear voice transmissions. Voice can be passed from each site through conventional voice grade phone lines or microwave lines Only minor modifications are needed to the base station interface equipment to accommodate such sophisticated voice security systems. Any mobile can be upgraded to this capability by adding an external module. No internal changes to the radio are required. |
| UNIT IDENTIFICATION All units are automatically identified when they transmit. This is true regardless of whether the transmission takes place on the control channel or on a working channel. The system is able to accommodate 4095 discreet addresses independent of fleet and subfleet. | Each unit on each transmission is identified by the same ID regardless of the agency, fleet or subfleet in which he is currently operating. 4095 is more than twice the logical number of users in a fully loaded twenty channel system so there is more than sufficient capacity. |
| TRAFFIC LOGGING All system information is logged. Each unit transmission causes the units ID, agency, fleet, subfleet, channel, time, site and list of sites involved to be logged for management reports. | Statistics on system usage, such as peak loading, individual and group usage versus time as well as many other system parameters, are available for tabulation analysis. |
| TELEPHONE INTERCONNECT Authorized mobiles have the ability to place and receive calls and patch them to individuals or groups of mobiles which may or may not be equipped for telephone interconnect. | All mobiles and portables in the system can be interconnected to the telephone system. Those mobiles not specifically equipped for this can be patched by their dispatcher to maintain adequate control of system loading factors. |
| GROUP PRIORITY ASSIGNMENT Eight priority levels are provided in the system. Each group (as well as each individual) is assigned a priority. | System manager can set individual group priorities according to the criticality of their service. The flow of traffic is more easily maintained by providing recent users priority over nonrecent users of the same priority level. |

In the exemplary system, 11 bits are available to determine the address of a unit within an agency, fleet or subfleet. Twelve bits are available to determine the individual identity of a particular unit (i.e., its "logical ID"). The use of 11 bits for determining group addresses within an agency, fleet or subfleet provides great flexibility such that each agency may have many different fleet and subfleet structures. Furthermore, unit identification is not limited by a particular fleet and subfleet structure. The 4,096 unit identification codes can be divided among the subfleets in a manner that best suits a particular system.

Some features of this exemplary system which are believed to be particularly unique and advantageous are summarized briefly below (order of appearance not reflecting any order of importance—nor is this list to be considered in any way exhaustive or limiting):

(a) Widening the Retry Window

If a requested working channel assignment is not achieved, the request is automatically retried—and the time window in which such a retry is attempted is increased in duration as a function of the number of prior unsuccessful retries. This significantly decreases the average channel access time where noise is the real problem rather than request collisions—while still providing a recovery mechanism for request collision problems as well.

(b) Better Use of Subaudible Signalling

Rather than using subaudible signalling only to confirm channel assignments, a simple counter field is employed to greatly simplify such validity checking functions and to thus free the majority of the subaudible signalling capacity for other uses—e.g., a priority scan. In the exemplary embodiment a two bit subaudible "count" field for a given channel is incremented upon each new working assignment of that channel. Thus, if a radio unit observes a change in this field, it is programmed to immediately drop back to the control channel.

(c) Minimizing Priority Communique Fragmentations by Dynamically Altering Scan Functions After initiating a priority call, a radio temporarily (e.g., for two seconds) disables the usual multiple group scan on the control channel—in favor of looking for the highly probable returned higher priority call. This reduces the possibility of getting diverted momentarily into an ongoing lower priority communique—and also perhaps missing a fragment of the next higher priority communique. A similar temporary (e.g., two seconds)

scan preference (except for priority calls) for a just-previously involved call group also helps prevent fragmentation of non-priority communiques.

(d) Use of Transmission-Trunked Bit in Channel Assignment

The trunking system has two trunking modes:
(a) Transmission Trunked Mode in which the working channel is de-allocated as soon as the calling unit unkeys, and
(b) Message Trunked Mode in which the working channel is de-allocated "n" seconds following a unit's unkeying, unless another unit keys onto the channel within such "n" seconds. "n" is called the "hang time".

By dynamically insuring that both called and calling units "know" that a transmission-trunking mode is in effect, the calling unit may immediately revert to the control channel upon PTT release—thus immediately freeing the working channel for drop channel signalling from the control site. The called units can also be positively prevented from ever transmitting on the working channel—thus avoiding multiple keying of radio units on the working channel.

(e) Automatic Addressing of Immediately Returned Calls

Both the called and calling units/groups are identified in the initial channel assignment signalling. The called unit captures the calling unit ID and is enabled to automatically address a return call to the just calling radio if the PTT switch is depressed within a predetermined period (e.g., 5 seconds) after the just completed communique even if the system is in the Transmission Trunked Mode. Not only does this simplify the necessary call back procedures and minimize access times, by allowing greater application of the Transmission Trunked Mode it also increases the probability of successful message exchanges—especially in poor signalling areas.

(f) 9600 bps Permits "Loose" Synchronization

Use of higher rate 9600 bps signalling permits simplified bit synchronization to be rapidly achieved by simple "dotting" sequences (i.e., a string of alternating ones and zeros 101010 . . . ). Thus, there is no need to keep information transfers precisely synchronized across all channels. This not only reduces hardware requirements system-wide, it also facilitates a more fault tolerant architecture at the control site.

(g) Improved Channel Drop Signalling

The drop channel signalling is simply an extended dotting sequence. Therefore, each radio may easily *simultaneously* look for drop channel signalling and channel assignment confirmations. This means that the control site may more immediately consider a given working channel available for reassignment—and, if "loaded up," immediately interrupt the drop-channel signalling to issue fresh channel assignment confirmation signals on the working channel (which each individual radio will ignore unless properly addressed to it). As a result, a "loaded" system (i.e., one where existing channel requests are already queued) may drop a working channel within about only 100 msec—and immediately reassign it to a queued request. Radios that happen to enter late into the call being dropped can detect that fact and properly drop from the channel because of the ability to simultaneously look for drop channel signalling and channel assignment confirmation signalling.

(h) Feature Programming

To avoid cumbersome feature programming (and reprogramming to add features) by factory or distribution personnel, novel procedures are employed which safely permit the end user to perform all such "programming." All units are programmed at the factory to perform all available functions. A function enable bit map *and* a unique physical ID are together encrypted at the factory and provided to the use as "Program Codes." When the user programs each device, its encrypted "Program Codes" are input to a Radio Programmer which, in turn, properly sets the feature enable bit map in a connected radio unit—*and* the decoded physical ID—*and* a "Just Programmed" bit). The "just programmed" radio device logs into the central controller with a request for a logical ID—based on its apparent physical ID. If illegal copying of function enabling Program Codes occurs, then the *same* logical ID will be assigned—and the usefulness of the radio within the trunked repeater system will be diminished.

(i) Double Channel Assignment Handshake—One Being on the Assigned Working Channel A first 9600 bps channel assignment signalling exchange occurs on the control channel. However, a confirmation (i.e., a second handshake) then occurs on the assigned working channel. Thus, it is assured that the desired channel has been successfully assigned and locked onto before the central controller unmutes the called units on the assigned channel. The signalling is such that if the channel conditions are unsuitable for voice, the handshake will fail, thus terminating the call automatically.

BRIEF DESCRIPTION OF THE DRAWINGS

These as well as other objects and advantages of this invention will be more completely understood and appreciated by carefully studying the following detailed description of the presently preferred exemplary embodiment taken in conjunction with the accompanying drawings, of which:

FIG. 11 is a simplified flowchart of suitable computer programs which might be utilized at the site controller, the calling unit and the called unit so as to achieve the signalling protocol of FIG. 10.

DETAILED DESCRIPTION OF PRESENTLY EXEMPLARY EMBODIMENTS

Figure 1:
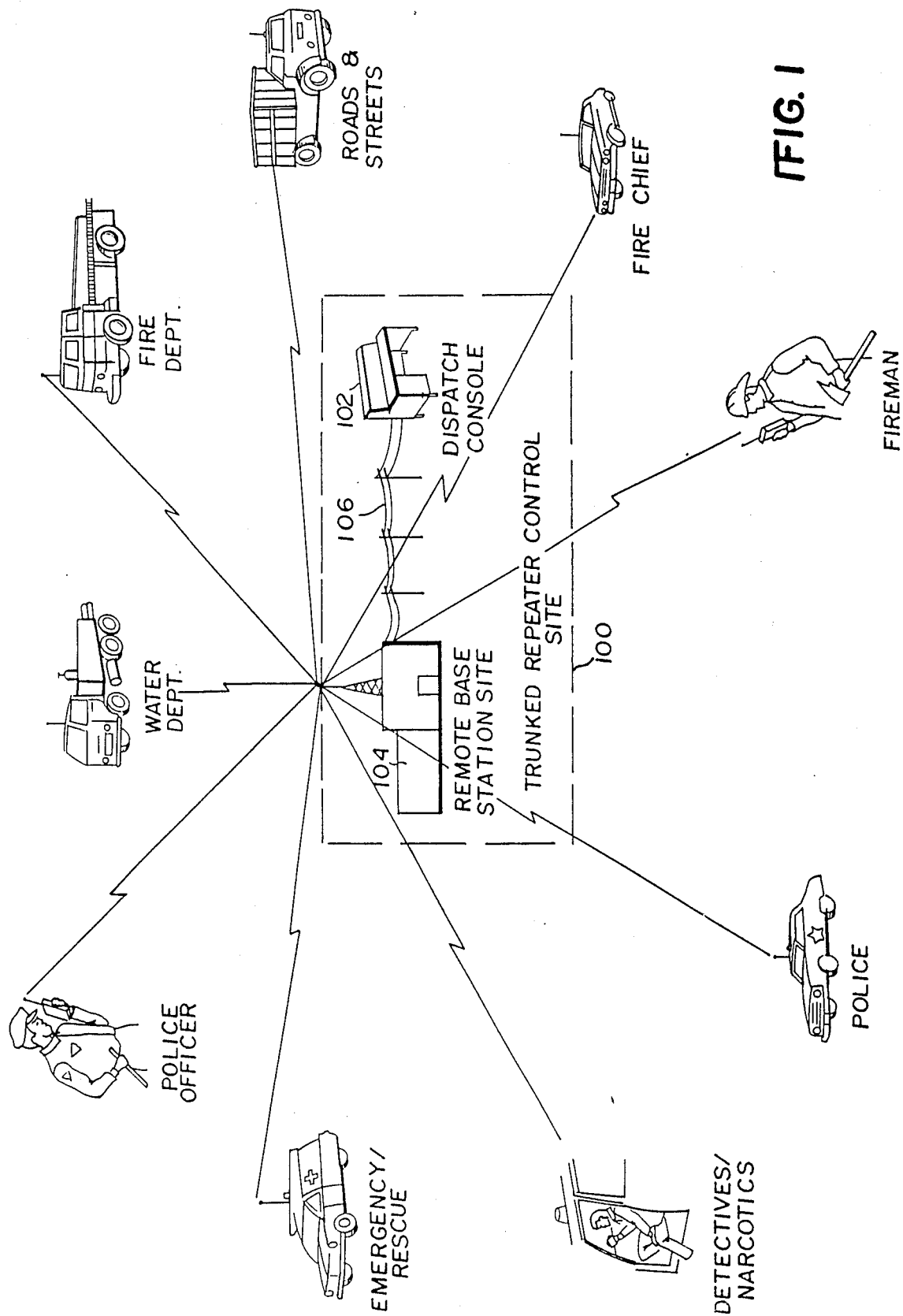
FIG. 1 is a general explanatory diagram of trunked radio repeater system in accordance with this invention.

An exemplary trunked radio repeater system in accordance with this invention is generally depicted at FIG. 1. As illustrated, individual units of various groups communicate with each other (both within and possibly outside of their own group) via shared radio repeater channels located at a trunked repeater control site 100. The dispatch console 102 may be housed directly at the repeater station site 104 or may be remotely located via other communication facilities 106 as will be appreciated by those in the art. There also may be multiple dispatch consoles 102 (e.g., one for each separate fleet) and a master or supervisory dispatch console for the entire system as will also be appreciated by those in the art.

Figure 2:
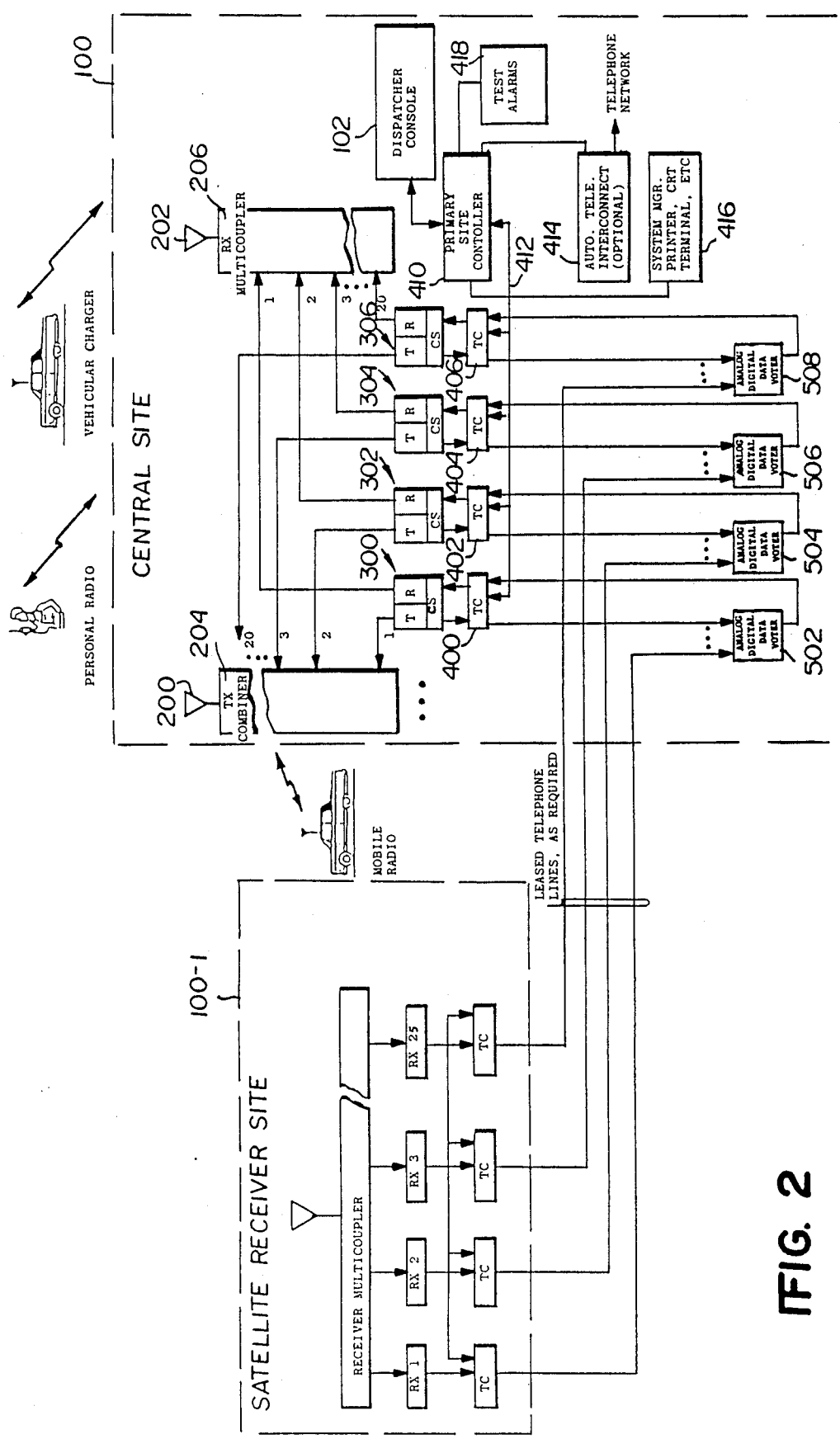
FIG. 2 is a simplified block diagram of a central control site (as well as a satellite receiver site) in the trunked repeater system of FIG. 1.

The central site is depicted in somewhat more detail at FIG. 2 in conjunction with one or more satellite receiver sites 100-1. As will be appreciated, the satellite receiver sites are displaced spatially from the central site 100 such that radio reception may temporarily be better at one or the other of the chosen antenna sites. Thus, received signals from the satellite sites as well as the central sites are combined in "voter" circuitry so as to choose the best available signal for control or communication processes.

At the central site, a transmitting antenna 200 and receiving antenna 202 (which may sometimes be a common antenna structure) may be utilized with conventional signal combining/decombining circuits 204, 206 as will be apparent to those in the art. The transmitting and receiving RF antenna circuitry 200-206 thus individually services a plurality of duplex RF channel transmit/receive circuits included in a plurality of RF repeater "stations" 300, 302, 304, 306, etc. Typically, there may be 20 such stations. Each station transmitter and receiver circuitry is typically controlled by a dedicated control shelf CS (e.g., a microprocessor-based control circuit) as is also generally depicted in FIG. 2. Such control shelf logic circuits associated with each station are, in turn, controlled by trunking cards TC (e.g., further microprocessor-based logic control circuits) 400, 402, 404 and 406. All of the trunking cards 400-406 communicate with one another and/or with a primary site controller 410 via control data bus 412. The primary site controller (and optional backup controllers if desired) may be a commercially available general purpose processor (e.g., a PDP 11/73 processor with 18 MHz-J11 chip set). Although the major "intelligence" and control capability for the entire system resides within controller 410, alternate backup or "fail soft" control functions may also be incorporated within the trunking cards 400-406 so as to provide continued trunked repeater service even in the event that controller 410 malfunctions or is otherwise taken out of service. (More detail on such fail soft features may be found in commonly assigned concurrently filed application Ser. No. 057,046 entitled "Fail Soft Architecture For Public Trunking System".)

An optional telephone interconnect 414 may also be provided to the public switched telephone network. Typically, a system manager terminal, printer, etc., 416 is also provided for overall system management and control (together with one or more dispatcher consoles 102). A special test and alarming facility 418 may also be provided if desired.

The signal "voter" circuits 502, 504, 506 and 508 are connected so as to receive a plurality of input digital or analog signals and to selectively output therefrom the strongest and/or otherwise most reliable one of the input signals. Thus, received signals from the central site 100 are input to respective ones of the channel voter circuits 502-508 while additional similar input signals are generated from receivers in the satellite receiver site 100-1 and also input to the appropriate respective voter circuits. The results of the voting process are then passed back to the trunking card circuits 400-406 where they are further processed as the valid "received" signals.

Figure 3:
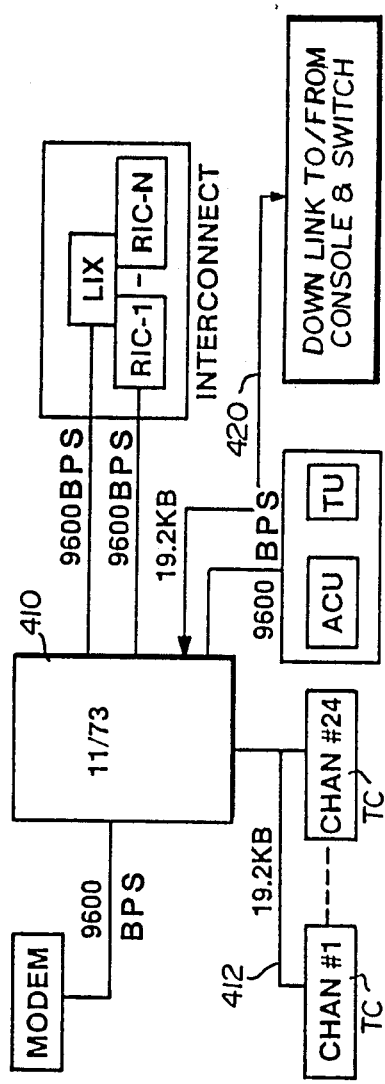
FIG. 3 is a simplified block diagram of the general site architecture of the main controller for the central control site.

A slightly more detailed view of the site architecture for control data communication is shown in FIG. 3. Here, the PDP 11/73 controller 410 is seen to communicate over a 19.2 Kilobit link 412 with up to 25 trunking control cards TC controlling respective duplex repeater circuits in those individual channels. Another high-speed 19.2 Kilobit link 420 is used to communicate with the hardware that supports the down link to/from the dispatch console 102. Other data communication with the central processor 410 is via 9600 baud links as shown in FIG. 3. The central processor 410 may include, for example, a 128 Kilobyte code PROM, 1 Megabyte of RAM and 32 DHV-11/J compatible RS-232C ports. It may typically be programmed using Micropower Pascal to provide a multi-tasking, event-driven operating system to manage all of the various data communication ports on an acceptable real time basis.

Figure 4:
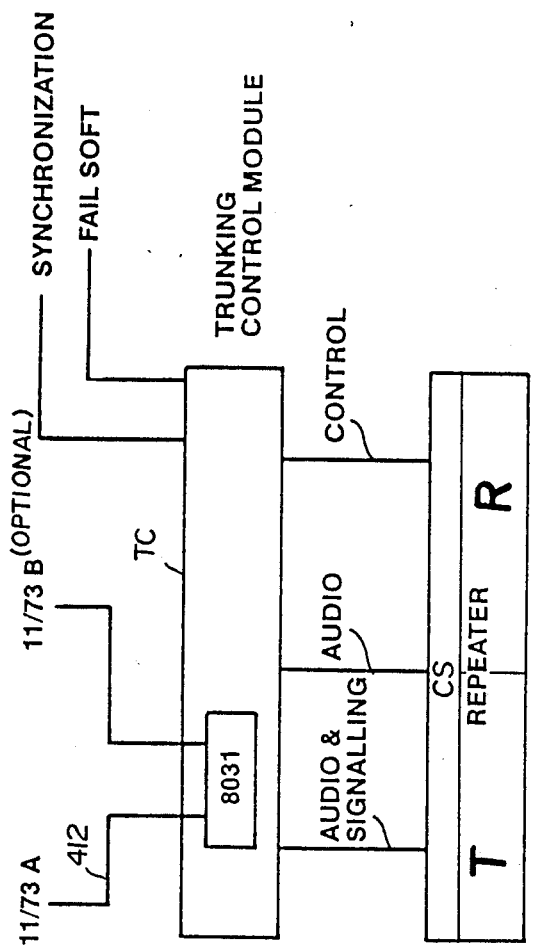
FIG. 4 is a simplified block diagram of the channel architecture used within each channel of the central site architecture shown in FIG. 3.

At each controlled repeater channel, the 19.2 Kilobit data bus 412 (as well as that from an optional back-up controller if desired) is monitored by an 8031 processor in the TC module. The TC trunking control module exercises control over the control shelf CS of its associated repeater with audio, signalling, and control busses as depicted in FIG. 4, and may typically also receive hard-wired providing clock synchronization and a "fail soft" indication (e.g., indicating that normal control by the central controller 410 is not available and that an alternate distributed control algorithm should then be implemented within each of the trunking control modules TC).

Figure 5:
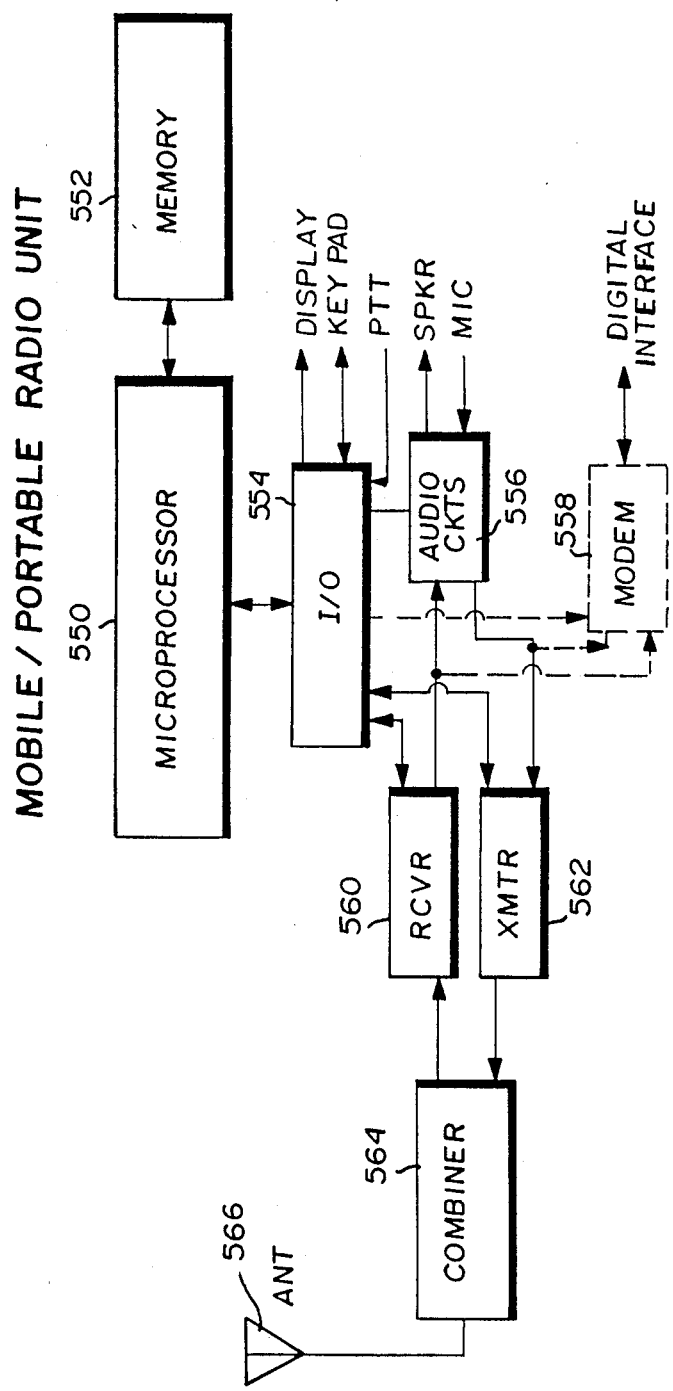
FIG. 5 is a simplified general block diagram of a technical mobile/portable radio unit to be utilized for communication within the trunked repeater system of FIG. 1.

The general architecture of a suitable mobile/portable radio unit for use within the exemplary system is also microprocessor based as depicted in FIG. 5. Here, microprocessor 550 is provided with suitable memory 552 and input/output circuits 554 so as to interface with the radio unit display, keypad, push-to-talk (PTT) switch as well as audio circuits 556 which provide basic analog audio outputs to the speaker and accept analog audio inputs from the microphone. Auxilliary control over a modem 558 as a digital interface (e.g., to voice encryption, vehicle location or other types of digital communication subsystems) may also be provided if desired. And, of course, the I/O circuits 554 also permit suitable programmed control over RF receiver 560 and transmitter 562 which, via conventional signal combiners 564 permit two-way fully duplexed communication over a common antenna 566 as will be appreciated by those in the art.

A detailed and indepth description of all units and sub-units of such a sophisticated system would necessarily be extremely voluminous and complex. However, since those in this art are already generally familiar with digitally controlled trunked repeater systems with suitable RF transmitter and receiver circuits, programmed general purpose computer controllers, etc., no such exorbitantly detailed description is believed necessary. Instead, it would only serve to obscure the subject matter which constitutes the invention. Accordingly, the remainder of this description will concentrate on the signalling protocol utilized to inititate and terminate calls within the system since this is believed to constitute a significant improvement (both in reliability and speed)—while still facilitating the retention of many highly desirable system features and meeting or exceeding *all* APCO-16 requirements.

Call placement begins by the calling unit transmitting a special digital channel request signal on the dedicated control channel to the central site. In return, the central site transmits, outbound on the control channel, a special digital channel assignment signal. The calling unit then responds by switching immediately to the assigned working channel where the central site now sends an assignment confirmation message (also in high-speed digital form). If the calling unit properly receives the confirming signals on the working channel, then it responds with an acknowledgment back to the central site on the working channel to complete the second handshake (i.e., the first one was on the control channel and now one has taken place on the working channel) before the central site releases the called units to begin the requested communication session on the working channel. Alternatively, if during this process the calling unit receives a channel update message on the control channel addressed to it, then the channel request call is temporarily suspended (unless the channel request under way is an emergency or higher priority request) and the calling unit then reverts to the called state so as to receive the incoming call. If the calling unit receives no response (or an improperly completed response handshake sequence), it automatically waits a random period before retrying to successfully place the call request (up to a maximum of 8 tries).

The called unit initially resides in a standby configuration where it continually monitors the digital messages appearing on the control channel outbound from the central site. If it detects a channel assignment message addressed to it as the called party (or perhaps as one party of a called group), then the called unit immediately switches its operations onto the assigned working channel. There, it also detects the confirmation signals outbound on the working channel from the central site and, if successfully confirmed, awaits a release or unsquelching signal on the working channel (e.g., transmitted from the central site in response to successful completion of a handshake with the calling unit on the working channel). The called unit may also receive a channel update message indicating that the group is already operating on a working channel.

Figure 6:
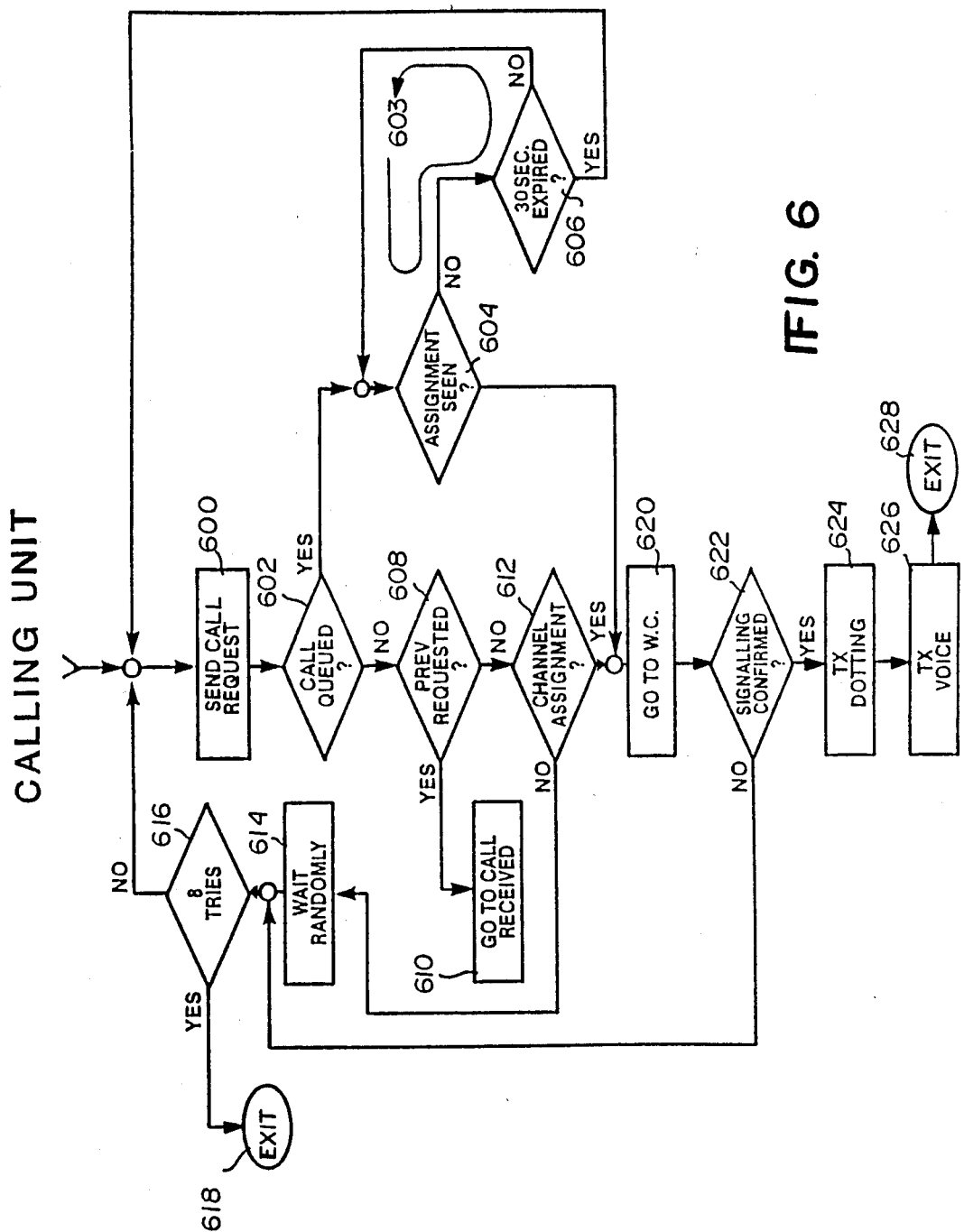
FIG. 6 is a simplified flowchart of typical call processing sequence in the exemplary embodiment from the perspective of a calling unit.

The programming for a calling unit is generally depicted in the simplified flowchart of FIG. 6. Here, upon entry into the calling mode, a call request is sent on the control channel CC at step 600. A test is made at 602 for call queuing. If queued, transfer is made to wait loop 603 (including a test for a detected assignment at atep 604 followed by a check for expiration of a 30 second timer at 606 (whereupon control effectively is passed back to a manual requirement to restart the calling process via exit 607).

If the call request is not queued, then a test is made at 608 to see if this particular unit has already previously been requested as a called party. If so, then transfer is made at 610 to the called mode of operation. If not, then a check for a returning channel assignment is made at 612. If not received at the expected time, then a random wait is interposed at 614 before a test is made at 616 to see if eight tries have yet been made to complete this particular call. If so, then the subroutine is exited at 618. If not, then the subroutine is re-entered at 600.

If a channel assignment is successfully detected at either 612 or 604, then the unit operation is immediately switched to the assigned working channel at step 620 and a test for the second successful handshake (confirmed signalling) is made at 622. If unsuccessfully confirmed on the working channel, then exit will be made and the call is terminated. However, if the second handshake (e.g., the handshake on a working channel) is successfully confirmed and completed, then the calling unit transmits an elongated sequence of dotting at 624 (e.g., representing the successful second handshake) followed by a transmission of voice at 626 (or data if a digital communication session has been requested) over the assigned working channel before exit from the subroutine is taken at 628 (e.g., to a standard monitoring routine which looks for release of the PTT switch and transmits an unkeyed signal at 627).

Figure 7:
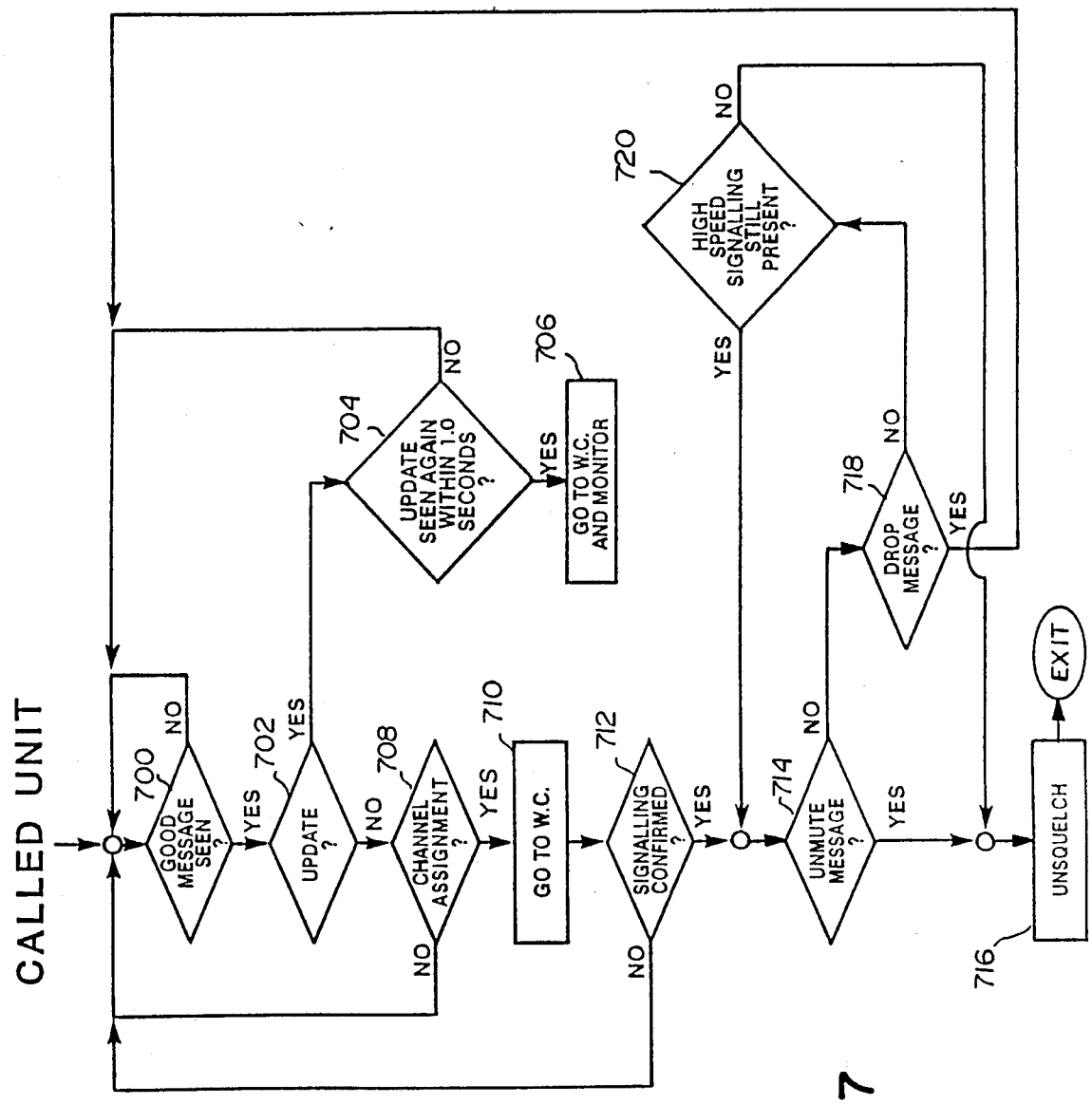
FIG. 7 is a simplified flowchart of a call processing sequence within a called unit.

The protocol followed by a called unit is generally depicted at FIG. 7 (e.g, representing a suitable computer program for controlling the unit in this mode of operation).

Upon entry, the control channel is simply monitored at 700 for any "good" message (e.g., one addressed to this particular unit). If such a message is detected, a check is made at 702 for an "update" type of message. If the message is of this type, then a check is made at 704 to see if it is repeated within about 1.0 seconds. If not, then reentry into the called mode is made. However, if the update of a higher priority incoming call is repeated within such period, then an immediate switch to the there-assigned working channel is made at 706. If signalling is not confirmed at 707, then an immediate switch to unsquelching (716) is made and that channel is thereafter monitored. If, on the other hand, signalling confirmation at 707 is achieved, it is an indication that normal channel assignment is, in reality, taking place and control is passed to block 714 to look for an unmute message.

If no channel update message is detected at 702, then the message is checked to see if it was a channel assignment at 708. If not, then return is made to the beginning of the subroutine. However, if a proper channel assignment has been received, then a switch to the assigned working channel is made at 710 and a check for proper confirmation signalling on the working channel is then made at 712. If a proper unmuting message is thereafter also received on that assigned working channel at 714, then the called unit unsquelches at 716. If no unmuting message is received at 714, then a check for a drop message is made at 718. If there is no drop message but high-speed signalling is still present on the working channel (as detected by 720), then a further check is made for the unmute message at 714. However, if there is no drop message and the high-speed signalling has ceased at 720, then the called unit is nevertheless unsquelched at 716.

Figure 8:
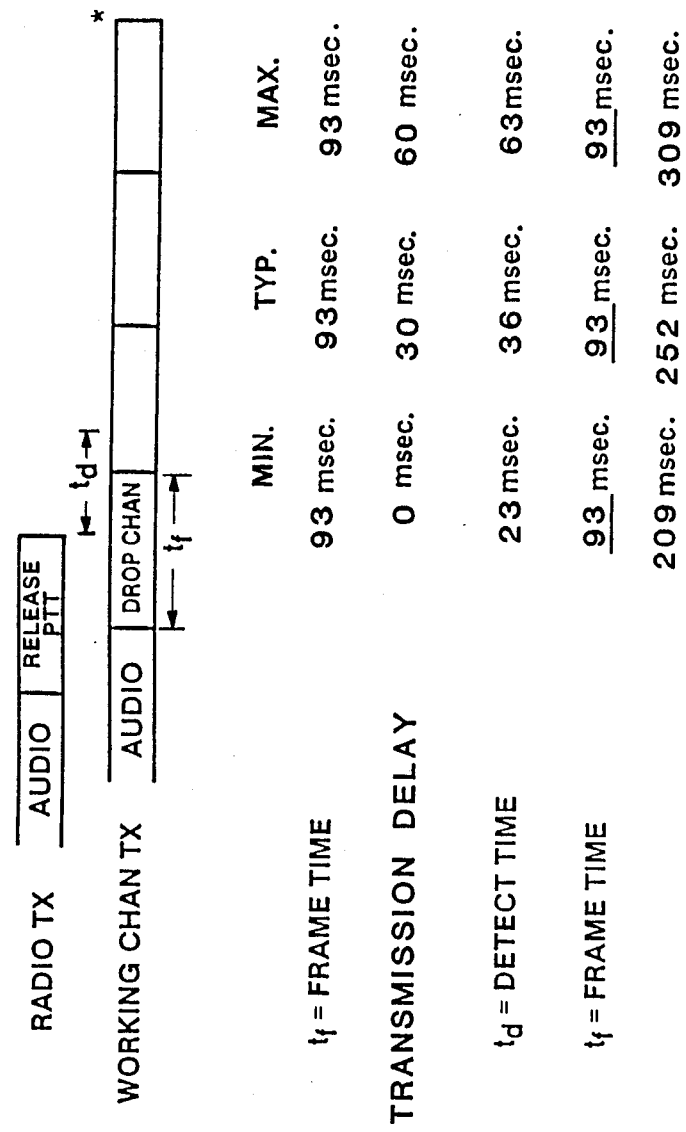
FIG. 8 illustrates the trunked channel dropping procedure and typical required drop times.

At the conclusion of a desired audio call, the calling radio transmitter transmits a special release PTT signal as depicted graphically in FIG. 8. After a suitable transmission and detection delay period, the assigned working channel responds by transmitting a drop channel signal on the working channel. As shown in FIG. 8, this results in a typical working channel availability in only 167 milliseconds after the release PTT signal is initiated.

Figure 9:
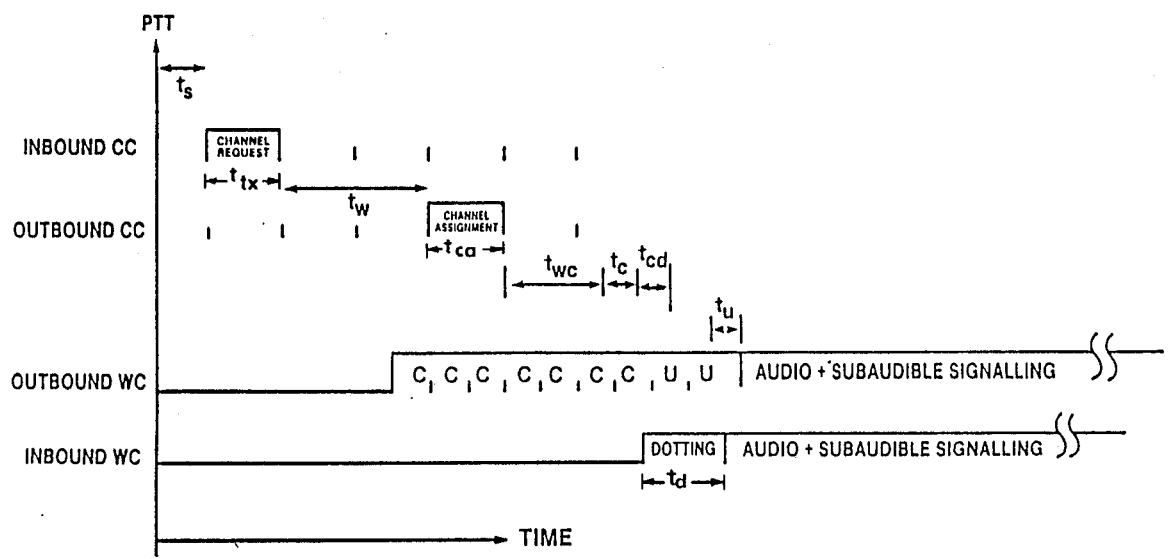
FIG. 9 generally illustrates call initiation signalling within the exemplary system as well as typical timing requirements.

Typical timing of calling protocol signals is depicted graphically in FIG. 9 where it can be seen that typical calling protocol can be completed and communication begun over the desired working channel within about 290 milliseconds.

Figure 10:
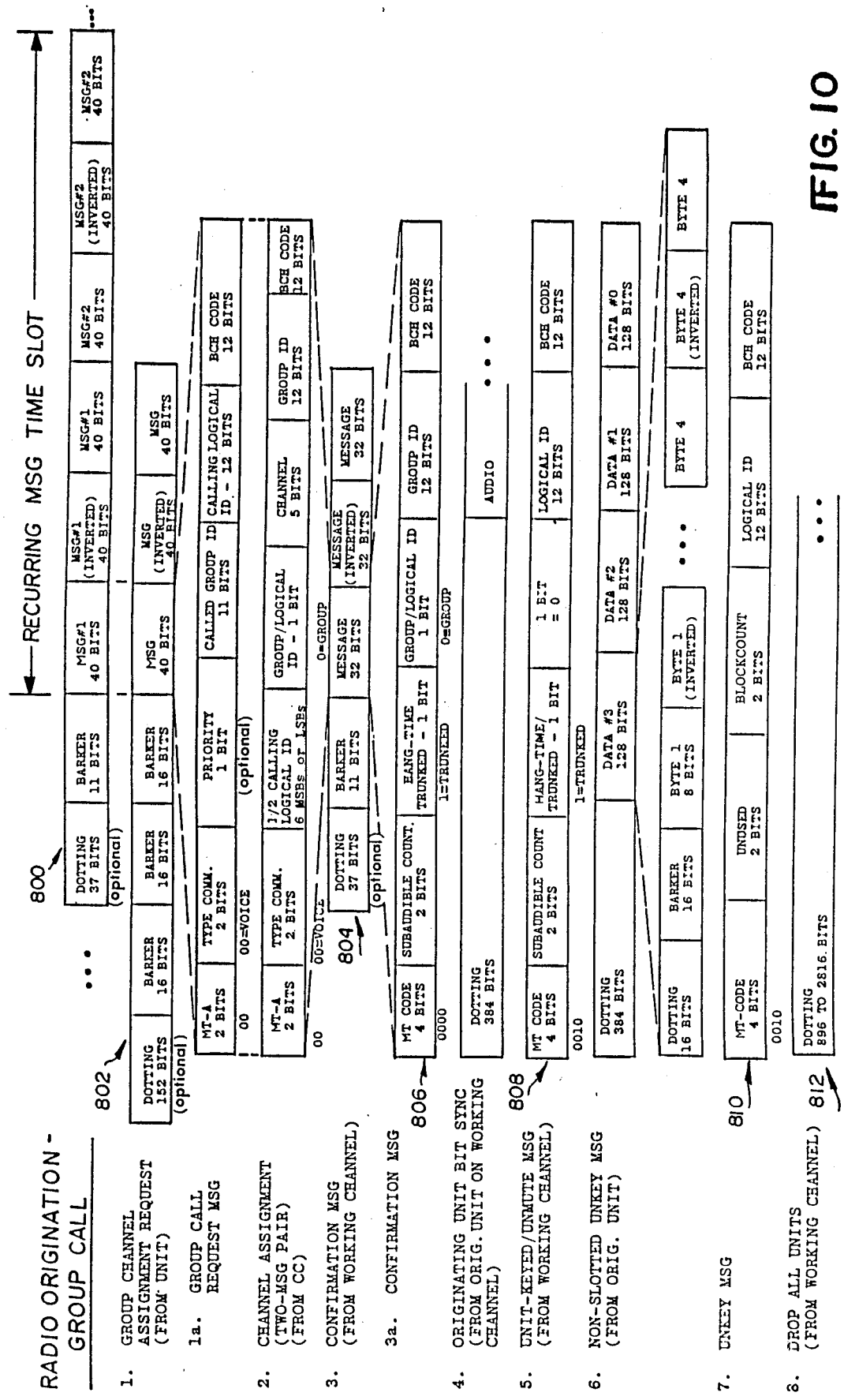
FIG. 10 is a graphical illustration of the control signalling protocol utilized to initiate and terminate trunked radio communications on either an individual or group basis in the exemplary system.

Some bit-level maps of some relevant message formats (and other related signalling formats and protocol) are graphically illustrated at FIG. 10. The control channel transmits an outbound continuous transmission repeating the format 800 depicted in FIG. 10. As will be seen, each 40 bit message is transmitted three times (including one inverted transmission where all 0's are changed to 1's and vice versa) and there are two such messages transmitted per recurring message time "slot." As will be appreciated, the optional dotting prefix (if used) insures continued bit synchronization by receiving units and the unique Barker code permits frame synchronization so as to define bit boundaries between the 40 bit-level messages which follow. Since the control channel transmits these message slots continuously, no dotting prefix is needed and but one transmission of the word framing Barker code will suffice for each recurrent transmission cycle. Of course, if desired, a relatively short dotting prefix may be used to even further insure continued bit synchronization.

Inbound messages on the control channel CC are of the format 802 shown in FIG. 10 and may comprise, for example, group/individual channel assignment requests transmitted from a calling unit. Here, the dotting prefix is considerably longer and the word framing Barker code is repeated three times so as to insure that the receiving circuits at the central site are properly synchronized before the 40 bit messages (again with three-fold redundancy) are transmitted. Preferably, suitable transmission timing circuits are utilized so as to make such incoming control channel messages synchronously time "slotted"—meaning that the messages on the inbound portion of the control channel occur during the same time slot as outgoing messages from the central site on the control channel (as generally indicated by dotted lines in FIG. 10).

A group call request message format is shown in expanded scale in FIG. 10. It includes a two-bit message type (MT) code (the message-type field may be extended in a tree-logic fashion to include additional bits as will be appreciated). This MT-A field thus distinguishes a group call from an individual call, for example. A type of communications field comprising two-bits indicates the type of communication session being requested. (If desired, a priority field of one-bit also may be used to indicate if a highest priority emergency call is being requested.) The called identification code of 11 bits (representing either a group or an individual unit) is followed by a 12-bit field representing the identity of the calling unit ("logical ID"). The 40-bit message concludes with 12 bits of standard BCH code for error detection and correction purposes as will be appreciated.

The returning channel assignment message actually comprises a two message pair also having a format as shown in expanded scale at FIG. 10. The first two bits identify the message type (MT) and the next two bits identify the type of communication session which is to take place. The identity of the calling unit is next represented by a six-digit field (e.g., with the 6 most significant bits being transmitted in one message of the two-message pair while the 6 lowest significant bits are transmitted in the other of such messages). The next one-bit field identifies whether a group call or an individual call is involved and the assigned working channel is identified by the following 5 bits. The group or individual identity of the called unit(s) is contained within the next 12 bits followed by 12 bits of BCH error detection/correction code.

Once operation reverts to the assigned working channel, the central site transmits a confirmation message of format 804 outbound on the working channel. As will be observed, it is of the same general form as the continuous transmissions on the control channel CC *except* that the message length has been reduced to 32 bits on the working channel. Once again, the message is sent with three-fold redundancy (one being inverted). Preferably, the confirmation message is timed in the working channel so as to be within the same time slot as messages being transmitted on the control channel. The format of the 32 bit confirmation message is also depicted in expanded form at 806 in FIG. 10. Here, 4 bits are devoted to the message type code while 2 additional bits provide a subaudible frame count useful in framing and otherwise decoding the lower speed subaudible digital data (which will subsequently appear on the working channel to be monitored by units residing thereat). One bit is also devoted to identifying the communication session as one which is transmission trunked or one which is message trunked. Another bit of the confirmation message 806 identifies the call as being either of a group or an individual unit while the identity of the called group or individual unit is contained within the following 12 bits. The confirmation message 806 concludes with 12 bits of BCH error detection/correction code.

Once the second handshake (i.e., on the working channel) has been successfully concluded, the calling unit transmits 384 bits of dotting followed by audio (in the case of a requested audio communication session) as is also depicted at FIG. 10.

The elongated dotted sequence transmitted by the calling unit on the working channel constitutes an acknowledgment of the successful handshake sequence and, in response, the central site transmits an outbound digital message on the working channel to positively unmute the called unit(s). The format 808 of such an unmute message is depicted in FIG. 10. Once again, the message type code uses the first four bits while a subaudible frame count constitutes the next two bits. The next bit denotes trunked status or non-trunked status (e.g., regular hang-time) while the next bit is effectively unused (e.g., preset to zero in all unmute messages)—but which may be used for other optional purposes. The identity of the unit(s) to be unmuted is set forth in the next 12 bits followed by 12 bits of standard BCH error detection/correction code.

At the conclusion of a communication session on the working channel, the calling unit again transmits 384 bits of dotting followed by 4 data blocks of 128 bits each. Each such data block includes 16 dotting bits and a 16 bit Barker code (some of which bits may be "filler" as will be appreciated) as prefix followed by 8-bit bytes, each of which is transmitted with three-fold redundancy (one inverted)—thus constituting a 32-bit message characteristic of digital messages being transmitted on the working channel. The format of the 32-bit unkey message 810 is also shown in FIG. 10. Here, a 4-bit message type code is followed by 2 unused bits and 2 bits for a block count. The identity of the calling unit is set forth in the next 12 bits followed by 12 bits of standard BCH error detection/correction code.

Finally, in response to receipt of the unkey message at the central site on the working channel, an outbound digital message on the working channel of a super-extended dotting sequence (e.g., 896 to 2816 bits) is transmitted from the central site as depicted at 812 in FIG. 10—and in response, all units then on that channel drop from that particular working channel and revert to the active control channel.

The sequence of programmed events occurring at the site controller, the calling unit and the called unit(s) during a typical call origination/termination sequence is depicted in the parallel flowcharts of FIG. 11.

Each programmed unit has a quiescent control channel (CC) monitor routine where, in a quiescent state, all units and the site controller reside. When the calling unit enters the calling subroutine from the CC monitor at 1100, a test is made at 1102 to see if this calling attempt is a retry. If not, the retry counter is set to a maximum content of 8 at 1106 and then decremented by one at 1108 (which step is directly taken from test 1102 if a retry is in progress). If the retry counter has been decremented to zero as tested at 1110, then a failed acquisition audible beep is generated at 1112 and exit is taken back to the CC monitor. On the other hand, if the maximum number of retries have not yet been made, then a channel assignment request is transmitted on the control channel and slot synchronization at 1114 (e.g., at time $t_1$).

Upon detecting an inbound message, the site controller will receive and store the channel assignment request and assign a free working channel at step 1200. In the exemplary system, a response to an inbound request may be supplied within a predetermined delay. The outbound channel assignment messages (i.e., a message pair) are transmitted on the control channel as soon as possible at step 1204 (time $t_2$). The two message channel assignment pair is then received and stored from the control channel in the calling unit at step 1118 (the unit will look for the messages up to the maximum number of slots). If either message of the two message pair is successfully received, this will suffice. As previously explained, if a channel update is received in the interim, then an exit may be taken to a called state (assuming that the call request under way is not an emergency). If a valid channel assignment message has not been received as tested at 1120 and the maximum number of slots have been observed, then a suitable delay is loaded at 1122 an exit is taken back to the CC monitor (from which a return entry to the calling subroutine will soon be taken).

The process of loading in a suitable delay before retrying may be thought of as a progressive "widening" of the retry window—in a consciously controlled manner. There are three reasons why an inbound data message from a radio would not get a response: (1) the inbound message was not successfully detected; (2) the outbound message was not successfully detected; or (3) a collision occurred (two or more mobiles sent in a request on the same inbound control channel slot).

Given that a collision has occurred, unless mobiles randomly retransmit their requests, collisions will continue to occur. Consequently, when a radio fails to receive a response to an inbound message, it waits a "random" period of time to retransmit its request. However, if case (1) or (2) has occurred, there is really no reason to randomize the retry. Unfortunately, the radio cannot determine the cause of a failed response.

But, the longer a mobile waits to retransmit, the longer the average across time becomes in poor signalling areas since that is where the majority of retries take place. Since often it is noise and not collisions that cause missed responses, randomizing retries is often wasteful.

To correct this problem, the present invention takes some corrective action. First, non-channel-acquisition messages are caused to have a much slower retry rate than channel request messages. Access time for the former is not critical (whereas it is for the latter). So, if a collision occurs between a radio sending in a non-channel request message and a radio sending in a channel request message, the former's retry rate will be slow enough to guarantee no chance of a collision with the latter on the next retry.

Second, the random retry rate varies with the retry number. The retry algorithm (for channel acquisition messages only) widens the width of the retry window with each succeeding retry. This decreases the average access time in the presence of noise but still provides a recovery mechanism should the cause for a missed response be a collision.

The preferred embodiment uses the following simple rule:

| | |
|---|---|
| 1st retry | 2 slot random variability |
| 2nd retry | 4 slot random variability |
| succeeding retries | 8 slot random variability |

It also is possible to vary the retry window width as a function of the received bit error rate in order to gain still greater efficiency.

If a valid working channel assignment has been received as tested at 1120, then the calling unit switches immediately to the assigned working channel at 1124 and waits to receive a proper confirmation message on the working channel at 1126—which confirmation message is being transmitted by the site controller at step 1206 at time $t_3$. If the confirmation message is overridden by a drop message as tested at 1128 or by timeout of a preset timer at 1130, then the calling routine is aborted and return is taken to the CC monitor. On the other hand, if a proper confirmation message is received at 1126, then the calling unit begins to transmit 384 bits of dotting on the working channel at 1132 followed by voice transmissions (or other desired communication session) at 1134.

Back at the site controller, a check is made at 1208 for the acknowledgment dotting of extended duration on the working channel. If it is not received, then exit is taken. However, if it is properly received, then two unit-keyed/unmute messages are transmitted outbound on the working channel at step 1210.

While all of the above has been taking place, the called unit has (if everything is working properly) received and stored the two-message channel assignment pair from the control channel at time $t_2$ (at substantially the same time as the calling unit) as depicted at 1300. (Once again, seeing either message of the two message pair is sufficient). In response, the called unit is also switched to the assigned working channel at 1302 and has thereafter monitored the assigned working channel for the proper confirmation thereon at step 1304 (and at time t₃. Only if the proper confirmation message has been received does the called unit then look for and receive the unmute message transmitted from the site controller on the working channel at time t₅ and, in response, unmutes the receiver of the called unit on the working channel at 1306.

During the ensuing communication session on the assigned working channel between the calling and called unit(s), the site controller (via the TC's) continues to send subaudible new channel assignment (and drop) data to all units on all working channels at 1212 (thus enabling higher priority calls to be promptly received and accepted by all units). The site controller (via the proper TC) also continues to transmit channel update messages periodically on the control channel at 1214 (e.g., so as to permit late entrants to immediately go to the proper working channel). The site controller informs all TC's of the channel assignments and drops and, in response, each TC generates suitable subaudible signalling for its channel.

In existing systems subaudible signalling typically is used as a validity check by mobiles. When a mobile is on a working channel it monitors the subaudible signalling to make sure it belongs on that channel. There are at least two reasons why a radio could be onto a channel where it does not belong:

(1) being correctly within a communique on a working channel, it fails to see the channel drop; or
(2) monitoring the control channel, it incorrectly decodes a message and goes to an incorrect channel.

Problem (1) is solved by giving a two bit subaudible count to all radios on the channel. Every time a call is placed on a channel, the channel TC increments its count. Consequently, if a radio sees the count change, it "knows" it missed a channel drop sequence.

As for problem (2), there is a sufficiently high probability of incorrectly decoding outbound control messages on existing systems that a quick way to redirect radios from channels where they do not belong is typically provided. To do this, subaudible signalling typically is used exclusively for this purpose. However, with this invention, advantage is taken of the high information rate on the control channel, and a mobile is required to see an update message twice before going to a working channel. There is a negligible increase in the late entry time, but the probability of going to an incorrect channel is virtually eliminated. As a result, subaudible data can also be used for another purpose . . . e.g., a priority scan.

At the conclusion of the desired communications session, the unkeying of the PTT switch in the calling unit is detected at 1136 resulting in the sending of an unkeyed message on the working channel at 1138 (time t₆). If in a transmission-trunked mode, the calling unit may immediately revert to the control channel—thus immediately freeing the working channel In response, at 1216, the site controller receives the unkeyed message on the working channel and, at 1218, sends a super elongated dotting string (896 to 2816 bits on the working channel at time t₇). The called unit has, of course, also received the unkeyed message on the working channel at time t₆ and, in response, has already muted the receiver at 1308. The called unit receives the super-elongated dotting string outbound from the site controller on the working channel at time t₇ and, in response, reverts to the control channel at 1310.

A special priority scan sequence is used (in the preferred embodiment) to minimize communique fragmentation.

When a radio unit scans for multiple groups had a call is made to its priority group, the radio automatically disables the multiple group scan (in favor of a priority group only scan) for a two second interval upon returning to the control channel. Since the priority group was just communicating, the probability is high that another communique will take place within this interval. If the radio immediately scanned into another (non-priority) group call (which by definition is of a lower priority), and another communique then occurs on the priority group, the radio would hear a communique fragment from a non-priority group—and would have its entry into the next priority group communique delayed (priority scan typically may take between 1.0 and 1.5 seconds to get the radio into the priority group).

Another unique feature used to minimize communique fragmentation is a preference priority the radio automatically assigns to a just-previously monitored non-priority group. In essence, if a non-priority communique is monitored, for two seconds following the communique the radio will ignore all other scanned calls (except to the priority group of course) . . . similarly to priority group communiques. In addition, the radio always remembers the last non-priority group monitored. Upon returning from a priority group communique, the radio will prefer the last non-priority group monitored over any other groups being scanned.

In the example below, a '--' means the group is involved in a communique channel, and it is assumed that Group A is the priority group and that its communiques are separated by less than 2 seconds:

| Group A | ---- | ----- | -- | ------ | | |
|---|---|---|---|---|---|---|
| Group B | -------------------------------- | | | | | |
| Group C | | | | | | ------------------------------ |
| Radio monitors: | BBBAAA | AAAA | AA | AAAAA | BBBB | CCCC |

There is a bit (i.e., the message/transmission trunked bit) in the working channel confirmation signalling that informs the radios as to whether the communique is transmission-trunked or message-trunked. This unique feature offers greater frequency efficiency.

The calling radio will be on the working channel and is guaranteed to see the message/transmission trunked bit. If the bit is set to "Transmission Mode," the calling mobile knows the channel will be removed as soon as it stops transmitting. Consequently, when its PTT is released, the calling radio automatically and immediately goes back to the control channel. This gains channel usage efficiency because the working channel TC can being channel drop signalling as soon as it detects the calling mobile's unkey message. That is, one does not have to extend the signalling to make sure the transmitting mobile finishes transmitting, gets its receiver on channel and then has plenty of time to be guaranteed that the channel drop signalling is detected in the calling mobile.

Radios that are called also look at this message/transmission trunked bit, but for an entirely different reason. If the communique is message-trunked, radios that were called must be able to key on the assigned working channel in case they must offer a response before the channel drop. However, if the communique is transmission-trunked, none of the called radios should ever transmit on the assigned working channel. Therefor, if the bit is set to "Transmission" mode, called radios will not be permitted to key on the working channel. This is a very useful feature since it prevents radios from keying on top of each other.

The message/transmission trunked bit thus offers three system advantages: It makes transmission trunking more frequency (i.e., channel) efficient by decreasing the channel drop time (by a factor of three from typical prior systems), it reduces the dead time between transmission where users can not key (e.g., on typical existing systems, if a radio is keyed during the 0.5 second drop sequence it must wait until the sequence is complete), and it offers absolute protection from radios keying on top of each other on a working channel.

To make an Individual Call on the exemplary system, the calling radio uses a single inbound slot of the control channel to identify itself and to specify the radio being called. Both radios are referred, via an outbound control channel message, to an available working channel where the confirmation signalling takes place. The unmute message to the called radio (at the completion of the high speed confirmation signalling) also specifies the ID of the calling radio. The called radio automatically stores the ID of the calling radio and, if the PTT switch of the called radio is depressed within 5 seconds of the last PTT release of the calling station, will automatically place an individual call back to the original calling. This capability allows easy user-convenient transmission trunking, and therefor better frequency (i.e., channel) efficiency, during individual calls. It also allows the calling radio to contact a called radio and converse with no channel hang time even though the called radio is not previously programmed to initiate a call to the calling radio.

The signalling in the exemplary embodiment is extremely efficient, minimizng the channel drop time and therefor increasing system efficiency. It is unique in that, for example, it is high speed signalling as opposed to low speed typically used on all other existing systems. In addition, the signalling is designed specifically for minimizing message traffic in a distributed architecture site.

Without such novel channel drop signalling, as the channel starts dropping, a message would have to be sent from the working channel TC to the control channel TC (via the site controller) stopping all updates on the outbound control channel (i.e., those that are referring radios to the working channel now being dropped). Once off the air, the channel TC would have to send an additional message to the site controller informing it of such so it can reassign the dropped working channel when appropriate. Besides additional messages within the central site slowing the channel drop process, such prior techniques also incur additional loading on the site controller. Another aspect of the problem is that the drop channel signalling that is transmitted on the working channel must be of sufficient duration to guarantee that timing ambiguities don't permit a radio to enter late onto the channel once it is down . . . or even worse to enter late onto the channel after the next call has already started to take place on that channel.

The exemplary embodiment uses unique drop channel signalling, a unique radio signalling detection algorithm and timing of when the channel TC sends the drop channel message to the site controller.

By making the drop channel signalling 9600 bps dotting, not only can the drop channel signalling be detected and muted in radios prior to the radio operator hearing the signalling, but the detection algorithm places a light enough processor loading on the radios that they can simultaneously look for the dotting and for confirmation signalling.

The following rules are followed by a working channel TC as it drops:
 (1) Transmit 100 msec of dotting.
 (2) Without interrupting the dotting, send a channel drop message to the site controller.
 (3) Transmit an additional 200 msec of dotting . . . BUT . . . stop it and start sending a confirmation message should a channel assignment message be received from the site controller.

The following rules are followed by the site controller when it receives a drop channel message from a given channel TC:
 (1) Immediately inform the control channel TC so it can stop transmitting updates to the working channel TC.
 (2) Consider the channel immediately available for reassignment.

The following rules are followed by a radio as it leaves a working channel:
 (1) For ½ second ignore all channel updates to the group and channel of the communique being left.

The following rules are followed by a radio as it arrives on a working channel:
 (1) Look for dotting (i.e., of sufficiently long duration to constitute a drop channel signal) and confirmation signalling simultaneously.
 (2) If drop-channel dotting is seen, leave the channel.
 (3) If confirmation is seen then leave the channel if the ID is not correct, otherwise lock onto the signalling and do not unmute until told to do so.
 (4) If confirmation signalling stops, or no signalling is seen on the channel, look for subaudible and unmute.

To understand the significance of the net effect of these procedures, consider two cases: (1) when the channel is not immediately reassigned and (2) when it is immediately reassigned.

It is only possible for the radio to enter late onto the drop channel signalling 100 msec following the point when the drop channel message was sent to the site controller. So if the channel is not being reassigned, a later entering radio will see the additional dotting being transmitted and will know to drop off the channel. On the other hand, if the system is loaded (e.g, call requests are queued in the site controller) the channel immediately gets assigned to the first group in the queue. A radio that attempts to enter late into the call just dropped will see the confirmation message with the group of the next call starting to take place and will know to drop off the channel.

The bottom line is that dropping a channel in a loaded system requires only 100 msec of signalling and only one message to the site controller. Radios that happen to enter late into the call being dropped detect that fact because of the radio's ability to look for the drop channel signalling and the confirmation signalling simultaneously.

For an increase in the radio price, the PST radio manufacturer may program additional of these "features" into radios. The typical prior way to do this is to burn a unique PROM or an EEPROM at the factory. One disadvantage of this approach is the expense of uniquely programming each radio before it leaves the factory—and it is inefficient to upgrade a radio should a customer subsequently desire additional features.

However, the exemplary embodiment permits one to eliminate factory programming costs. Since each radio is programmed in the field (e.g., groups, systems, etc.) by the customer, features should be programmed into the radio at that time. The problem is how to control the programming task sufficiently to make sure the customer only programs purchased features.

Every shipment of radios that goes to a customer will have a sheet of paper which lists a set of Programming Codes and Physical IDs (one pair for each radio). Each Programming Code is an encryption of a "feature enable bitmap" and the Physical ID of the radio.

When a customer programs a radio he/she must do two things. First, he/she programs the radio. To do this, he/she selects the Programming Code representative of the features he/she has purchased for the radio and enters it in the Radio Programmer. He/she then programs the radio using the Radio Programmer while the Programming Code prevents him/her from programming disabled features. Second, the user enters the radio onto the system database via the system manager. The radio's Physical ID must be specified in order to get the radio into the database.

Anytime the Radio Programmer writes data into a radio, it sets a "Just Programmed" bit inside the radio's personality. Whenever a radio is turned on, it checks that bit. If set, the radio will use its Physical ID to request a Logical ID from the site controller before allowing its user to communicate on the trunked system. The site controller will go to the system manager data base to determine the Logical ID to be assigned to the radio. Notice that if a customer tries using the same Programming ID for programming different radios he/she will end up with the same Logical ID in each radio which means unique identification capability is lost. This is the same consequence suffered if a customer copied the PROM used in existing systems.

The result is that one has the same level of protection,—while avoiding the need to program radios in the factory. Adding features to a radio involves issuing an updated Programming ID, ambiguities in programming radios are eliminated (e.g., in existing systems a radio could be programmed to do something it was not enabled to do . . . so when a customer programs it and it doesn't work he/she cannot tell whether the radio is erroneously programmed or the feature is disabled), and no special software is written in the mobiles . . . just the Radio Programmer. This last benefit is nice since fixing a software bug relative to feature enable/disable would involve changing code in just a few computers rather than for all radios in the field.

Detailed descriptions of the signalling protocols and formats involved in many different types of cell origination sequences are summarized below:

I. RADIO ORIGINATION, LOGICAL ID ACQUISITION SEQUENCE

A. The CC transmits a continuous stream of control messages which all inactive mobiles receive. The messages are sent two messages to a 30-msec frame in the following frame format:
Dotting = 32 bits
Barker = 16 bits (e.g., 11 bits Barker code plus 5 bits (dotting preamble)
Message #1 = 40 bits
Message #1 (inverted) = 4 bits
Message #1 = 40 bits
Message #2 = 40 bits
Message #2 (inverted) = 40 bits
Message #2 = 40 bits B. When mobile power is turned on, it receives a site ID message from the Control Channel (CC) in the following format:
MT-A = 2 bits (e.g., 11)
MT-B = 3 bits (e.g., 111)
MT-C = 4 bits (e.g., 1110)
Delay = 2 bits
Channel = 5 bits
Priority = 3 bits
Homesite = 1 bit
Failsoft = 2 bits
Site ID = 6 bits
BCH code = 12 bits Delay specifies the maximum number of control channel slots before a control channel responds to an inbound transmission. Channel specifies the channel number for the active control channel. Priority prohibits mobiles with lower priority from transmitting on the inbound control channel. Home site bit specifies whether the site ID is the home ($=0$) or adjacent ($=1$) ID.

C. If desired, and if priority allows, mobile optionally transmits a login request on the control channel in synchronism with the received control channel messages. The frame form is as follows:
Dotting = 152 bits
Barker Code (repeated three times) = 48 bits (including filler)
Message = 40 bits
Message (inverted) = 40 bits
Message = 40 bits
The login message is coded as follows:
MT-A = 2 bits
MT-B = 3 bits
Group ID = 11 bits
Logical ID = 12 bits
BCH Code = 12 bits
If the mobile has no logical ID, it will transmit the logical ID request message The logical ID request message is coded as follows:
MT-A = 2 bits
MT-B = 3 bits
MT-C = 3 bits
Physical ID = 20 bits
BCH Code = 12 bits D. The control channel responds with a logical ID assignment message.

II. RADIO CALL SEQUENCE—RADIO ORIGINATION, GROUP CALL

A. Control channel transmits a continuous stream of control messages which all inactive mobiles receive. The messages are sent two messages to a 30-msec frame that has the following format:
Dotting = 32 bits
Barker = 16 bits
Message #1 = 40 bits
Message #1 (inverted) = 40 bits
Message # = 40 bits
Message #2 = 40 bits Message #2 (inverted)=40 bits
Message #2=40 bits B. Mobile that wishes to originate a group call transmits a group channel assignment request on the control channel in synchronism with the received control channel messages. The frame format is as follows:
Dotting=152 bits
Barker (repeated three times)=48 bits
Message=40 bits
Message (inverted)=40 bits
Message=40 bits The group call request message is coded as follows:
MT-A=2 bits
Type Communications (e.g., voice, data, interconnect or voice privacy)=2 bits
Not used=1 bit
Group ID=11 bits
Logical ID=12 bits
BCH Code=12 bits C. The control channel responds with a channel-assignment two-message pair. Coding is as follows:
MT-A Code=2 bits
Type Communications (e.g., voice)=2 bits
½ Logical ID=6 MSBs or LSBs
Group/Logical=1 bit
Channel=5 bits
Group ID=12 bits
BCH Code=12 bits D. All mobiles of the called group switch to assigned working channel and receive a confirmation message. Slotted working channel messages are transmitted using the following frame:
Dotting=32 bits
Barker=16 bits
Message=32 bits
Message (inverted)=32 bits
Message=32 bits The group call confirmation message is coded as follows:
MT Code=4 bits
Subaudible count=2 bits
Message/Transmission Trunking=1 bit
Group/Logical ID=1 bit
Group ID=12 bits
BCH Code=12 bits E. Originating mobile receives confirmation message and transmits 384 bits of dotting, then audio.

F. Working channel receives dotting and transmits two unit-keyed/unmute messages.
MT Code=4 bits
Subaudible count=2 bits
Message/Transmission Trunking=1 bit
Filler=1 bit
Logical ID=12 bits
BCH Code=12 bits Called mobile receives unmute message and unmutes audio.

G. Active mobiles on other working channels receive a subaudible channel assignment message.

H. Control channel transmits channel update message for late entry mobiles.

I. Transmitting mobile unkeys and sends a non-slotted unkey message. All non-slotted message formats are:
Dotting=384 bits
Data Block #3=128 bits
Data Block #2=128 bits
Data Block #1=128 bits
Data block #0=128 bits Data Block #3, #2, #1 and #0 are identical—except for a two bit block count—(each block is repeated four times) and each has the following format:

Dotting = 16 bits
Barker Code = 16 bits
Byte 1 = 8 bits
Byte 1 (inverted) = 8 bits
Byte 1 = 8 bits
Byte 2 = 8 bits
Byte 2 (inverted) = 8 bits
.
.
Byte 3 = 8 bits
Byte 4 = 8 bits
Byte 4 (inverted) = 8 bits
Byte 4 = 8 bits The unkey message is coded as follows:
MT Code = 4 bits
Unused = 2 bits
Block Count = 2 bits
Logical ID = 12 bits
BCH Code = 12 bits The unkey message is coded as follows:
MT Code = 4 bits
Unused = 2 bits
Block Count = 2 bits
Logical ID = 12 bits
BCH Code = 12 bits J. Working channel transmits 896 to 2816 bits of dotting to drop all mobiles from the channel.

III. RADIO CALL SEQUENCE-RADIO ORIGINATION, INDIVIDUAL CALL

A. Control transmits a continuous stream of control messages which all inactive mobiles receive.

The messages are sent two messages to a 30-msec. frame that has the following format:
Dotting=32 bits
Barker=16 bits
Message #1=40 bits
Message #1 (inverted)=40 bits
Message #1=40 bits
Message #2=40 bits
Message #2 (inverted)=40 bits
Message #2=40 bits b. Mobile that wishes to originate an individual call transmits an assignment request on the control channel in synchronism with the received control channel messages. The frame format is as follows:
Dotting=152 bits
Barker (repeated three times)=48 bits
Message=40 bits
Message (inverted)=40 bits
Message=40 bits The individual call request message is coded as follows:
MT-A Code=2 bits
Type Communications (e.g., voice)=2 bits
Logical ID (called)=12 bits
Logical ID (caller)=12 bits
BCH Code=12 bits C. The control channel responds with a channel-assignment two-message pair. Coding is as follows:
MT-A Code=2 bits
Type Communications (e.g., voice)=2 bits
½ Logical ID=6 MSBs or 6 LSBs
Group/Logical ID=1 bit Channel=5 bits
Logical ID=12 bits
BCH Code=12 bits D. Both calling (last logical ID) and called mobile switch to assigned working channel and receive a confirmation message. Slotted working channel messages are transmitted using the following frame:
Dotting=32 bits
Barker=16 bits
Message=32 bits
Message (inverted)=32 bits
Message=32 bits The individual call confirmation message is coded as follows:
MT Code=4 bits
Subaudible Count=2 bits
Message/Transmission Trunking=1 bit
Group/Logical ID=1 bit
Logical ID=12 bits
BCH Code=12 bits E. Originating mobile receives confirmation message and transmits 384 bits of dotting, then audio.

F. Working channel receives dotting and transmits two unit-keyed/unmute messages:
MT Code=4 bits
Subaudible Count=2 bits
Message/Transmission Trunking=1 bit
Unused bit=1 bit
Logical ID=12 bits
BCH Code=12 bits Called mobile receives unmute messages and unmutes audio.

G. Active mobiles on other working channels do not receive a subaudible channel assignment message.

H. Control channel transmits channel update message for late entry mobiles.

I. Transmitting mobile unkeys and sends a non-slotting unkey message. All non-slotted message formats are:
Dotting=384 bits
Data #3=128 bits
Date #2=128 bits
Data #1=128 bits
Data #0=128 bits
Data #3, #2, #1, and #0 are identical (repeated four times) and each has the following format:

---

Dotting = 16 bits
Barker = 16 bits
Byte 1 = 8 bits
Byte 1 (inverted) = 8 bits
Byte 1 = 8 bits
Byte 2 = 8 bits
Byte 2 (inverted) = 8 bits
.
.
.
Byte 3 = 8 bits
Byte 4 = 8 bits
Byte 4 (inverted) = 8 bits
Byte 4 = 8 bits

---

The unkey message is coded as follows:
MT Code=4 bits
Unused=2 bits
Subcount=2 bits
Logical ID=12 bits
BCH Code=12 bits

IV. RADIO CALL SEQUENCE-RADIO ORIGINATION, EMERGENCY GROUP CALL

A. Control channel transmits a continuous stream of control messages which all inactive mobiles receive. The messages are sent two messages to a 30-msec. frame that has the following format:
Dotting=32 bits
Barker=11 bits
Message #1=40 bits
Message #1 (inverted)=40 bits
Message #1=40 bits
Message #2=40 bits
Message #2 (inverted)=40 bits
Message #2=40 bits B. Mobile that wishes to originate an emergency group call transmits an assignment request on the control channel in synchronism with the received control channel messages. The frame format is as follows:
Dotting=152 bits
Barker (repeated three times)=48 bits
Message=40 bits
Message (inverted)=40 bits
Message=40 bits The emergency group call request message is coded as follows:
MT-A Code=2 bits
Type communications=2 bits
Status/C=1 bit
Group ID=11 bits
Logical ID=12 bits
BCH Code=12 bits C. The control channel responds with two channel-assignment messages that are coded as follows:
MT-A Code=2 bits
Type communications=2 bits
½ Logical ID=6 MSBs or LSBs
Group/Logical ID=1 bit
Channel=5 bits
Group ID=12 bits
BCH Code=12 bits D. All mobiles of the called group switch to assigned working channel and receive a confirmation message. Slotted working channel messages are transmitted using the following frame:
Dotting=32 bits
Barker=16 bits
Message=32 bits
Message (inverted)=32 bits
Message=32 bits The emergency group call confirmation message is coded as follows:
MT Code=4 bits
Subaudible count=2 bits
Message/Transmission Trunking=1 bit
Group/Logical ID=1 bit
Group ID=12 bits
BCH=12 bits E. Originating mobile receives confirmation message and transmits 384-bits of dotting, then audio.

F. Working channel receives dotting and transmits two unit-keyed/unmute messages.
MT Code=4 bits
Subaudible Count=2 bits
Message/Transmission Trunking=1 bit
1 bit (unused)=0
Logical ID=12 bits
BCH Code=12 bits Called mobile receives unmute message and unmutes audio.

G. Active Mobiles on other working channels receive subaudible channel assignment message.

H. Control channel transmits channel update message for late entry mobiles.

I. Transmitting mobile unkeys and sends two non-slotted unkey messages. All non-slotted message formats are:
Dotting = 384 bits
Data #3 = 128 bits
Data #2 = 128 bits
Data #1 = 128 bits
Data #0 = 128 bits
Data #3, #1, #1 and #0 are identical (repeated four times) and each has the following format:

```
Dotting = 16 bits
Barker = 16 bits
Byte 1 = 8 bits
Byte 1 (inverted) = 8 bits
Byte 1 = 8 bits
Byte 2 = 8 bits
Byte 2 (inverted) = 8 bits
.
.
Byte 3 = 8 bits
Byte 4 = 8 bits
Byte 4 (inverted) = 8 bits
Byte 4 = 8 bits
```

The unkey message is coded as follows:
MT = Code = 4 bits
Subaudible Count = 2 bits
Logical ID = 12 bits
BCH Code = 12 bits

V. RADIO CALL SEQUENCE-RADIO ORIGINATION, STATUS CALL

A. Control channel transmits a continuous steam of control messages which all inactive mobiles recieve. The messages are sent two messages to a 30-msec. frame that has the following format:
Dotting = 32 bits
Barker = 16 bits
Message #1 = 40 bits
Message #1 (inverted) = 40 bits
Message #1 = 40 bits
Message #2 = 40 bits
Message #2 (inverted) = 40 bits
Message #2 = 40 bits B. Mobile that wishes to originate a status call transmits a status request on the control channel in synchronism with the received control channel messages. The frame format is as follows:
Dotting = 152 bits
Barker (repeated three times) = 48 bits
Message = 40 bits
Message (inverted) = 40 bits
Message = 40 bits
The status request message is coded as follows:
MT-A Code = 2 bits
MT-B Code = 3 bits
MT-C Code = 3 bits
3 bits (unused) = 000
Auto Response = 1 bit (e.g., yes)
4 bits (unused) = 0000
Logical ID = 12 bits
BCH = 12 bits C. The control channel responds with a status page message that is coded as follows:
MT-A Code = 2 bits
MT-B Code = 3 bits
MT-C Code = 4 bits
2 bits (unused) = 00
Auto response = 1 bit (e.g., yes)
Status = 4 bits
Logical ID = 12 bits
BCH Code = 12 bits D. Called mobile transmits a control channel status message that is coded as follows:
MT-A Code = 2 bits
MT-B Code = 3 bits
MT-C Code = 3 bits
3 bits (unused) = 000
Auto Response = 1 bit (e.g., yes)
Status = 4 bits
Logical ID = 12 bits
BCH = 12 bits E. Control channel responds with a status acknowledge message that is coded as follows:
MT-A Code = 2 bits
MT-B Code = 3 bits
MT-c Code = 4 bits
2 bits (unused) = 00
Auto Response = 1 bit (e.g., yes)
Status = 4 bits
Logical ID = 12 bits
BCH Code = 12 bits
Originating mobile receives status message.

VI. RADIO CALL SEQUENCE-RADIO ORIGINATION, SPECIAL CALL

A. Control channel transmits a continuous stream of control messages which all inactive mobiles receive. The messages are sent two messages to a 30-msec. frame that has the following format:
Dotting = 32 bits
Barker = 16 bits
Message #1 = 40 bits
Message #1 (inverted) = 40 bits
Message #1 = 40 bits
Message #2 = 40 bits
Message #2 (inverted) = 40 bits
Message #2 = 40 bits B. Mobile that wishes to originate a special call transmits a special call request on the control channel in synchronism wit the received control channel messages. The frame format is as follows:
Dotting = 152 bits
Barker (repeated three times) = 48 bits
Message = 40 bits
Message (inverted) = 40 bits
Message = 40 bits
The special call request message is coded as follows:
MT-A Code = 2 bits
MT-B Code = 3 bits
MT-C Code = 3 bits
2 bits (unused) = 00
Type Communications Code = 2 bits (e.g., interconnect)
1 bit (unused) = 0
Priority Code = 3 bits
Logical ID = 12 bits
BCH Code = 12 bits C. The control channel responds with a channel-assignment two-message pair. Coding is as follows:
MT-A Code=2 bits
Type Communication Code=2 bits (e.g., intcnt)
½ Logical ID=6 MSBs or LSBs
Group/Logical=1 bit
Channel=5 bits
Logical ID=12 bits
BCH Code=12 bits D. Mobile switches to the assigned working channel and receives a confirmation message. Slotted working channel messages are transmitted using the following frame.
Dotting=32 bits
Barker=16 bits
Message=32 bits
Message (inverted)=32 bits
Message=32 bits
BCH Code=12 bits The special call confirmation message is coded as follows:
MT Code=4 bits
Subcount=2 bits
Hang/time/Trunked=1 bit
Group/Logical ID=1 bit
Logical ID=12 bits
BCH Code=12 bits E. Originating mobile receives confirmation message and trasmits a multi-block special call message. The message frame (shown below) can have from 1 to 16 blocks.

```
Dotting       = 384 bits
Data #3 Block #1 = 128 bits
Data #2 Block #1 = 128 bits
Data #1 Block #1 = 128 bits
Data #0 Block #1 = 128 bits
Data #3 Block #2 = 96 bits
Data #2 Block #2 = 96 bits
  .
  .
  .
```

Data #3, #2, #1, #0 are identical in each block (repeated four times). Coding for Block #1 Data is:

```
Dotting = 16 bits
Barker  = 16 bits
Byte 1  = 8 bits
Byte 1  = (inverted) = 8 bits
Byte 1  = 8 bits
Byte 2  = 8 bits
Byte 2 (inverted) = 8 bits
  .
  .
  .
Byte 3  = 8 bits
Byte 4  = 8 bits
Byte 4 (inverted) = 8 bits
Byte 4  = 8 bits
```

Data in blocks after block #1 do not have dotting or Barker code. If telephone interconnect is required, block #1 data is coded as follows:
Group Count=4 bits
Individual Count=4 bits
Phone Digit Count=4 bits
Phone Digit #1=4 bits MSD
Phone digit #2=4 bits
BCH Code=12 bits If no interconnect is required, block #1 is coded as
Group Count=4 bits
Individual Count=4 bits
Group/Logical ID=12 bits
BCH Code=12 bits Subsequent blocks are coded with either one group ID, one logical ID, or five telephone digits as required to satisfy the block #1 counts. The telephone digits first, then the logical ID's, then the group ID's. Digit coding is one digit per nibble (null=1010). ID coding is
8 Bite=10101010 (8 bits)
Group/Logical ID=12 bits
BCH Code=12 bits F. Working channel transmits a slotted working channel special call receive bitmap message. Slotted working channel messages are transmitted using the following frame:
Dotting=32 bits
Barker=16 bits
Message=32 bits
Message (inverted)=32 bits
Message=32 bits
BCH Code=12 bits The special call receive bit map is coded as follows (use of similar acknowledgment bit maps is the subject of related commonly assigned copending application No. 056,923 filed June 3, 1987):

```
MT Code    = 4 bits
Block #1 bit = 1 bit (e.g., OK)
Block #2 bit = 1 bit (e.g., OK)
Block #3 bit = 1 bit (e.g., 0 = repeat)
Block #4 bit = 1 bit
  .
  .
  .
Block #16 bit = 1
BCH Code   = 12 bits
```

G. Originating mobile receives bitmap message and transmits a multi-block special call message. The message frame (shown below) can have from 1 to 16 blocks.

```
Dotting       = 384 bits
Data #3 Block #1 = 128 bits
Data #2 Block #1 = 128 bits
Data #1 Block #1 = 128 bits
Data #0 Block #1 = 128 bits
Data #3 Block #2 = 96 bits
Data #2 Block #2 = 96 bits
  .
  .
  .
```

Data #3, #2, #1, #0 are identical in each block (repeated four times). Coding for block #1 is

```
Dotting = 16 bits
Barker  = 16 bits
Byte 1  = 8 bits
Byte 1 (inverted) = 8 bits
Byte 1  = 8 bits
Byte 2  = 8 bits
Byte 2 (inverted) = 8 bits
  .
  .
  .
Byte 3  = 8 bits
Byte 4  — 8 bits
Byte 4 (inverted) = 8 bits
```

-continued

Byte 4 = 8 bits

Data in blocks after block #1 do not have dotting or Barker code.

Only blocks that have a "0" in their bitmap bit are transmitted. For example in step F, block #3 in step E would be the first block retransmitted. If no bit map is received within 100 msec. after steps E or G, all blocks are retransmitted.

Steps F and G are repeated until all blocks are received correctly (BITMAP=1's).

H. Control channel transmits a continuous stream of control messages which all inactive mobiles receive. The messages are sent two messages to a 30-msec. frame that has the following format:
 Dotting=32 bits
 Barker=16 bits
 Message #1=40 bits
 Message #1 (inverted)=40 bits
 Message #1=40 bits
 Message #2=40 bits
 Message #2 (inverted)=40 bits
 Message #2=40 bits I. The control channel sends from 0 to 16 channel-assignment two-message pairs as required for the special call. Coding for each message is as follows:
 MT-A Code=2 bits
 Type Communications Code=2 bits
 ½ Logical ID=6 MSBs or 6 LSBs
 Group/Logical ID=1 bit
 Channel=5 bits
 Logical=12 bits
 BCH Code=12 bits J. All called mobiles go to the assigned working channel and unmute (same as late entry). From this point the working channel messages are the same as a group or individual call.

VII. RADIO CALL SEQUENCE-RADIO ORIGINATION, DYNAMIC-REGROUP CALL

A. Control channel transmits a continuous stream of control messages which all inactive mobiles receive. The messages are sent two messages to a 30-msec. frame that has the following format:
 Dotting=32 bits
 Barker=16 bits
 Message #1=40 bits
 Message #1 (inverted)=40 bits
 Message #1=40 bits
 Message #2=40 bits
 Message #2 (inverted)=40 bits
 Message #2=40 bits B. Mobile that wishes to originate a dynamic-regroup call transmits a request on the control channel in synchronism with the received control channel messages. The frame format is as follows:
 Dotting=152 bits
 Barker=(repeated three times)=48 bits
 Message=40 bits
 Message (inverted)=40 bits
 Message=40 bits The dynamic-regroup request message is coded as follows:
 MT-A Code=2 bits
 MT-B Code=3 bits
 Group ID=11 bits
 Logical ID-2 bits
 BCH Code=12 bits C. The control channel responds with a dynamic-regroup message that is coded as follows:
 MT-A Code=2 bits
 MT-B Code=3 bits
 Group ID=11 bits
 Logical ID=12 bits
 BCH Code=12 bits D. Mobile acknowledges the dynamic regroup with a login message that is coded as follows:
 MT-A Code=2 bits
 MT-B Code=3 bits
 Group ID=11 bits
 Logical ID=12 bits
 BCH Code=12 bits E. Mobile may request cancellation of the dynamic-regroup with a message coded as follows:
 MT-A Code=2 bits
 MT-B Code=3 bits
 Group ID=11 bits
 BCH Code=12 bits F. Control channel responds with a cancel dynamic-regroup message that is coded
 MT-A Code=2 bits
 MT-B Code=3 bits
 Group ID=11 bits
 Logical ID=12 bits
 BCH Code=12 bits G. Mobile acknowledges the dynamic-regroup cancellation with a login message that is coded
 MT-A Code=2 bits
 MT-B Code=3 bits
 Group ID=11 bits
 Logical ID=12 bits
 BCH Code=12 bits

VIII. RADIO CALL SEQUENCE-CONSOLE ORIGINATION, GROUP CALL

A. Control channel transmits a continuous stream of control messages which all inactive mobiles receive. The messages are sent two messages to a 30-msec. frame that has the following format.
 Dotting=32 bits
 Barker=16 bits
 Message #1='bits
 Message #1 (inverted)=40 bits
 Message #1=40 bits
 Message #2=40 bits
 Message #2 (inverted)=40 bits
 Message #2=40 bits B. Console that wishes to originate a group call transmits a group call message to the downlink. The group call message is coded as follows:
 MID=1 byte (#0)=8 bits
 # bytes=1 byte (#1)=8 bits
 Source destination=bytes #2 and #3=16 bits
 Not Used=4 bits
 MT-A Code=2 bits
 Type communication=2 bits
 Group ID=12 bits
 Logical ID=12 bits
 Parity=1 byte (#8)=8 bits C. The control channel responds with a channel-assignment two-message pair. Coding is as follows:
 MT-A Code=2 bits
 Type Communications=2 bits
 ½ Logical ID=6 MSBs or LSBs Group/Logical ID = 1 bit
Channel = 5 bits
Group ID = 12 bits
BCH Code = 12 bits D. All mobiles of the called group switch to assigned working channel and receive a confirmation message. Slotted working channel messages are transmitted using the following frame:
Dotting = 32 bits
Barker = 16 bits
Message = 32 bits
Message (inverted) = 32 bits
Message = 32 bits The group call confirmation message is coded as follows:
MT Code = 4 bits
Subaudible Count = 2 bits
Hang Time/Trunked = 1 bit
Group/Logical ID = 1 bit
Group ID = 12 bits
BCH Code = 12 bits E. Originating console receives channel-assignment from the downlink and switches audio to the specified channel. Console message is coded as follows:
MID = 1 Byte (#0) = 8 bits
Bytes = 1 Byte (#1) = 8 bits
S/D = Bytes #2, #3 = 16 bits
Not Used = 4 bits
MT Code = 2 bits
Type communications = 2 bits
Logical ID—12 bits
Not Used = 2 bits
GR/L ID = 1 bit
Channel = 5 bits
Group ID = 12 bits
Parity = 1 Byte (#9) = 8 bits F. Working channel transmits two unit-keyed/unmute messages:
MT Code = 4 bits
Subaudible Count = 2 bits
Hang-time/trunked = 1 bit
1 bit (unused) = 0
Logical ID = 12 bits
BCH Code = 12 bits Called mobiles receive unmute message and unmute audio.

G. Active mobiles on other working channels receive a subaudible channel assignment message.

H. Control channel transmits channel update message for late entry mobiles.

I. Console sends unkey message that is coded as follows:
MID = 1 Byte(#0) = 8 bits
Bytes = 1 byte = 8 bits
Source Destination = Bytes #2 and #3 = 16 bits
Not used = 4 bits
MT Code = 4 bits
Not Used = 4 bits
Logical ID = 12 bits
Parity = Byte #7 = 8 bits J. Working channel transmits 896 to 2816 bits of dotting to drop all mobiles from the channel.

K. Console receives unkey message:
MID = Byte #0 = 8 bits
Bytes = Byte #1 = 8 bits
Source Designation = Bytes #2 and #3 = 16 bits
MT-A/B/C = 9 bites
Drop Cr = 1 bit
Not Used = 1 bit
Channel = 5 bits
Logical ID = 12 bits
Parity = Byte #8 = 8 bits

IX. RADIO CALL SEQUENCE-CONSOLE ORIGINATION, INDIVIDUAL CALL

A. Control channel transmits a continuous stream of control messages which all inactive mobiles receive. The messages are sent two messages to a 30-msec. frame that has the following format:
Dotting = 32 bits
Barker = 16 bits
Message #1 = 40 bits
Message #1 (inverted) = 40 bits
Message #1 = 40 bits
Message #2 = 40 bits
Message #2 (inverted) = 40 bits
Message #2 = 40 bits B. Console that wishes to originate an individual call transmits an individual call message to the downlink. The individual call message is coded as follows:
MID = Byte #0 = 8 bits
Bytes = Byte #1 = 8 bits
Source Destination = Bytes #2 and #3 = 16 bits
Not Used = 4 bits
MT-A Code = 2 bits
Type Communication = 2 bits
Logical ID = 12 bits
Logical ID = 12 bits
Parity = Byte #8 = 8 bits C. The control channel responds with a channel-assignment two-message pair. Coding is as follows:
MT-A Code = 2 bits
Type Communications = 2 bits
½ Logical ID = 6 MSBs or LSBs
Group/Logical ID = 1 bit
Channel = 5 bits
Logical ID = 12 bits
BCH Code = 12 bits D. Called mobile switches to assigned working channel and receives a confirmation message. Slotted working channel messages are transmitted using the following frame:
Dotting = 32 bits
Barker = 16 bits
Message = 32 bits
Message inverted = 32 bits
Message = 32 bits The individual call confirmation message is coded as follows:
MT Code = 4 bits
Subaudible Count = 2 bits
Hang Time/Trunked = 1 bit
Group/Logical ID = 1 bit
Logical ID = 12 bits
BCH Code = 12 bits E. Originating console receives channel-assignment message from the downlink and switches audio to the specified channel. Console message is coded as follows:
MID = Byte #0 (8 bits)
Bytes = Byte #1 = 8 bits
Source Destination = Bytes #2, and #3 = 16 bits
Not Used = 4 bits
MT Code = 2 bits
Type Communication Code = 2 bits
Logical ID = 12 bits
Not used = 2 bits GR/L ID = 1 bit
Channel = 5 bits
Logical ID = 12 bits
Parity = Byte #9 = 8 bits F. Working channel transmits two unit-keyed/unmute messages.
MT Code = 4 bits
Subaudible Count = 2 bits
Hang-Time/Trunked = 1 bit
1 bit (unused) = 0
Logical ID = 12 bits
BCH Code = 12 bits Called mobile receives unmute message and unmutes audio.

G. Active Mobiles on other working channels do not receive a subaudible channel assignment message.

H. Control channel transmits channel update message for late entry mobiles.

I. Console sends unkey message that is coded as follows:
MID = Byte #0 = 8 bits
Bytes = Byte #1 = 8 bits
Source Destination = Bytes #2 and #3 = 16 bits
Not Used = 4 bits
MT Code = 4 bites
Not Used = 4 bits
Logical ID — 12 bits
Parity = Byte #7 = 8 bits J. Working channel transmits 896 to 2816 bits of dotting to drop all mobiles from the channel.

K. Console receives unkey message:
MID = Byte #0 = 8 bits
Bytes = Byte #1 = 8 bits
Source Destination = Bytes #2 and #3 = 16 bits
MT-A/B/C = 9 bites
Drop Ch = 1 bit
Not Used = 1 bit
Channel = 5 bites
Logical ID = 12 bits
Parity = Byte #8 = 8 bits

X. RADIO CALL SEQUENCE CONSOLE ORIGINATION, ACTIVATE PATCH

A. Control channel transmits a continuous stream of control messages which all inactive mobiles receive. The messages are set two messages to a 30-msec. frame that has the following format:
Dotting = 32 bits
Barker = 16 bits
Message #1 = 40 bits
Message #1 (inverted) = 40 bits
Message #1 = 40 bits
Message #2 = 40 bits
Message #2 (inverted) = 40 bits
Message #2 = 40 bits B. Console that wishes to establish a patch transmits a patch ID assignment message to the downlink. The patch ID assignment message is variable length depending upon the group and individual ID counts:
MID = 29 = Byte #0 = 8 bits
Bytes = Byte #1 = 8 bits
Source/Destination = Bytes 1902, #3 = 16 bits
Not Used = 4 bits
Group Count = 4 bits
Individual Count = 4 bits
Logical ID = 12 bits
Not Used = 12 bits
Logical ID = 12 bits
Not Used = 12 bits
Logical ID = 12 bits
Not Used = 13 bits
Group ID = 11 bits
Not Used — 13 bits
Group ID = 11 bits
Not used = 13 bits
Patch ID = 11 bits
Parity = 8 bits C. Console receives an acknowledgement of the patch request from the site controller using a special group ID code (1000 0000 0000):
MID = 12 = Byte #0 = 8 bits   # Bytes = Byte #1 = 8 bits
Source/Destination = Bytes #2, #3 = 16 bits
Not Used = 4 bits
MT-A Code = 11 = 2 bits
MT-B Code = 100 = 3 bits
Patch ID = 11 bits
Group ID = 11 bits
Parity = Byte #8 = 8 bits D. When console wishes to activate the patch it transmits a patch activate message to the downlink.
MID = 27 = Byte #0 = 8 bits
Bytes = Byte #1 = 05 = 8 bits
Source/Destination = Bytes #2, and #3 = 16 bits
Not Used = 4 bits
MT Code = 4 bits (1110)
Not Used = 5 bits
Patch ID = 11 bits
Parity = Byte #7 = 8 bits E. The control channel responds with alias ID assignment messages. Group assignment messages are coded:
MT-A Code = 2 bits (11)
MT-B Code = 3 bits (110)
Alias Group ID = 11 bits
Not Used = 1 bit
Group ID = 11 bits
BCH Code = 12 bits Group alias ID messages are repeated in the control channel background mode and not acknowledged by the mobiles.

Individual alias ID assignment messages are coded as follows:
MT-A Code = 2 bits (11)
MT-B Code = 3 bits (101)
Alias Group ID = 11 bits
Logical ID = 12 bits
BCH Code = 12 bits F. All mobiles receive assignment messages but only individual call mobiles acknowledge message.
MT-A Code = 2 bits (11)
MT-B Code = 3 bits (110)
Alias Group ID = 11 bits
Logical ID = 12 bits
BCH Code = 12 bits G. Console receives patch assignment/activate messages to confirm patch. One message for each assignment:
MID = 12 = Byte #0 = 8 bits
Bytes = Byte #1 = 8 bits
Source/Destination = Bytes #2 and #3 = 16 bits
Not Used = 4 bits
MT-A Code = 2 bits (11)
MT-B Code = 3 bits (100)
Patch ID = 11 bits
Group ID = 12 bits
Parity = Byte #8 = 8 bits MID=13=Byte #0=8 bits
Bytes=Byte #1=8 bits
Source/Destination=Bytes #2 and #3=16 bits
Not Used=4 bits
MT-A Code=2 bits (11)
MT-B Code=3 bits (101)
Patch ID=11 bits
Logical ID=12 bits
Parity=Byte #8=8 bits H. Console originates a patch call by transmitting a group call message using the patch ID:
MID=24=Byte #0=8 bits
Bytes=Byte #1=8 bits
Source/Destination=Bytes #2 and #3=16 bits
Not Used=4 bits
MT Code=2 bits (00)
Type Communication=2 bits (00)
Patch ID=12 bits
Logical ID=12 bits
Parity=Byte #8

I. Control channel transmits group call message. Subsequent steps are same as console originated group call.

While only one exemplary embodiment of this invention has been described in detail, those skilled in the art will recognize that many variations and modifications may be made in this embodiment while still retaining many of its novel features and advantages. Accordingly, all such modifications and variations are intended to be included within the scope of the appended claims.

What is claimed is:

1. A method for achieving reliable and prompt communication within a trunked radio repeater system having a digital control channel and plural working channels, which working channels are assigned for temporary use of individual radio units specified by digital control signals transmitted over the control channel, said control channal carrying inbound digital control signals from said radio units to a control site, said inbound digital control signals having a time-multiplexed format defining discrete signalling slots, said method comprising the steps of:
   (a) requesting assignment of a working channel by passing digital request signals from a first radio unit to said control site over a control channel inbound digital signalling slot;
   (b) monitoring said control channel for responsive channel assignment signals returned over the control channel from the control site within a predetermined expected response time; and
   (c) if no such responsive channel assignment signals are detected, then (c1) repeating steps (a) and (b) within a retry time window, and (c2) increasing the duration of the retry time window as a function of the number of retries.

2. A method as in claim 1 wherein said repeating occurs at a randomly variable time within said retry time window.

3. A method as in claim 1 wherein said digital request signals are transmitted as messages within predetermined time slots and said increasing step (c2) increases the duration of said retry time window in accordance with the following tabulation:
first retry=two slot variability
second retry=four slot variability
succeeding retries=eight slot variability.

4. A method as in claim 1 wherein:
said signalling slots of said digital control signals transmitted over the control channel have a certain duration; and
said increasing step (c2) increases the duration of the retry time window also as a function of said certain duration of said control channel signalling slots.

5. A method as in claim 1 wherein said increasing step (c2) increases said retry time window duration by a time interval related to the duration of said control channel inbound digital signalling slots.

6. Apparatus for achieving reliable and prompt communication within a trunked radio repeater system having a digital control channel and plural working channels, which working channels are assigned for temporary use of individual radio units specified by digital control signals transmitted over the control channel, said control channel carrying inbound digital control signals from said radio units to a control site, said inbound digital control signals having a time-multiplexed format defining discrete signalling slots, said apparatus comprising:
   (a) means for requesting assignment of a working channel by passing digital request signals over a control channel inbound signalling slot;
   (b) means for monitoring said control channel for responsive channel assignment signals returned over the control channel within a predetermined expected response time;
   (c) means for repeating said request and monitoring functions within a retry time window if there is no detection of such responsive channel assignment signals; and
   (d) means connected to said repeating means for increasing the duration of said retry time window as a function of the number of retries.

7. Apparatus as in claim 6 wherein said means for repeating causes said repeated requests to occur at a randomly variable time within said retry time window.

8. Apparatus as in claim 6 wherein said digital request signals are transmitted as messages within predetermined time slots and said duration increasing means causes said time window to be progressively increased in accordance with the following tabulation:
first retry=two slot variability
second retry=four slot variability
succeeding retries=eight slot variability.

9. Apparatus as in claim 6 wherein:
said signalling slots of said digital control signals transmitted over the control channel have a certain duration; and
said increasing means includes means for including the retry time window as a function of said certain duration of said control channel signalling slots.

10. Apparatus as in claim 6 wherein said increasing means includes means for increasing said retry time window duration by a time interval related to the duration of said control channel inbound digital signalling slots.

11. A method for achieving reliable and prompt communication within a trunked radio repeater system having a digital control channel and plural working channels, which working channels are assigned for temporary use of individual radio units specified by digital control signals on the control channel, said method comprising the steps of:
monitoring a predetermined digital data field received via subaudible signals transmitted repeatedly over an assigned working channel after operation of a radio unit has been established thereon, and dropping operation of a radio unit from said working channel in response to a detected change in said predetermined digital data field.

12. A method as in claim 11 further comprising the step of:

changing the said predetermined data field transmitted on a given working channel each time a new assignment of that channel is made.

13. A method as in claim 12 wherein said predetermined data field comprises a multi-bit binary counter field which is changed by incrementing its contained count value.

14. Apparatus for achieving reliable and prompt communication within a trunked radio repeater system having a digital control channel and plural working channels, which working channels are assigned for temporary use of individual radio units specified by digital control signals on the control channel, said apparatus comprising:

means for monitoring a predetermined digital data field received via subaudible signals transmitted over an assigned working channel after operation of a radio unit has been established thereon; and means for dropping operation of a radio unit from said working channel in response to a detected change in said predetermined digital data field.

15. Apparatus as in claim 14 further comprising:

means for changing the said predetermined data field transmitted on a given working channel each time a new assignment of that channel is made.

16. Apparatus as in claim 15 including means for defining said predetermined data field as a multi-bit binary counter field which is changed by incrementing its contained count value.

17. A method for achieving reliable and prompt communication within a trunked radio repeater system having a digital control channel and plural working channels, which working channels are assigned for temporary use by individual radio units specified by digital control signals on the control channel, said method comprising the steps of:

detecting, by testing control signals provided on at least one of said control channel or assigned working channel at each radio unit involved in a communique, a trunked status signal identifying whether the then assigned usage of the working channel is to be transmission or message trunked;

immediately reverting operation of a calling unit to the control channel upon PTT release if transmission-trunked status has been detected; and preventing transmissions from a called unit on the assigned working channel if transmission-trunked status has been detected.

18. Apparatus for achieving reliable and prompt communication within a trunked radio repeater system having a digital control channel and plural working channels, which working channels are assigned for temporary use by individual radio units specified by digital control signals on the control channel, said apparatus comprising:

means for testing a trunked status signal within control signals provided on at least one of said control channel or assigned working channel at each radio unit involved in a communique;

means connected to said testing means for determining in response to said testing whether the then assigned usage of the working channel is to be transmission or message trunked;

means for immediately reverting operation of a calling unit to the control channel upon PTT release if transmission-trunked status has been detected; and means for preventing transmissions from a called unit on the assigned working channel if transmission-trunked status has been detected.

19. A method for achieving reliable and prompt communication within a trunked radio repeater system having a digital control channel and plural working channels, which working channels are assigned for temporary use of individual radio units specified by digital control signals on the control channel, said method comprising the steps of:

monitoring said control channel for a working channel assignment for a communique initiated by a calling radio unit;

recording the identity of the calling radio unit within a called radio unit;

subsequently automatically initiating a channel assignment call request from the just-called radio unit back to the earlier said calling radio unit using said recorded identity of the earlier said calling radio unit if a PTT switch of the just-called radio is actuated within a predetermined time period after cessation of the just earlier communique.

20. Apparatus for achieving reliable and prompt communication within a trunked radio repeater system having a digital control channel and plural working channels, which working channels are assigned for temporary use of individual radio units specified by digital control signals on the control channel, said apparatus comprising:

means for monitoring said control channel for a working channel assignment for a communique initiated by a calling radio unit;

means for recording the identity of the calling radio unit within a called radio unit; and means for subsequently automatically initiating a channel assignment call request from the just-called radio unit back to the earlier said calling radio unit using said recorded identity of the earlier said calling radio unit if a PTT switch of the just-called radio is actuated within a predetermined time period after cessation of the just earlier communique.

21. A method for achieving reliable and prompt communication within a trunked radio repeater system having a digital control channel and plural working channels, which working channels are assigned for temporary use by individual radio units specified by digital control signals on the control channel, said method comprising the steps of:

monitoring the control channel for working channel assignments addressed to a predetermined radio unit;

shifting said radio unit's operation to an assigned working channel in response to detection of such assignment on the control channel; and initially, upon arrival on the assigned working channel, simultaneously monitoring that working channel for an extended dotting signal and for confirmation signals confirming the assignment of that particular channel to said radio unit for a communique.

22. A method as in claim 21 wherein said initial monitoring of said assigned working channel includes:

shifting radio operations back to the control channel if said extended duration dotting signal is detected:
if said confirmation signals confirm the assignment of that particular channel to said radio unit, locking radio operations onto the assigned working channel and muting an output signal;
subsequently unmuting said output signal upon detection of further predetermined unmuting signals on the assigned working channel; and
upon cessation of said confirmation signals, if any, monitoring the assigned working channel for subaudible signalling and for unmuting signals.

23. A method as in claim 21 further comprising:
upon receipt of drop channel signalling, dropping said working channel and ignoring any channel updates to the address and working channel just dropped for a predetermined time period.

24. A method as in claim 21 in which, upon release of a PTT switch at a calling radio, an unkeyed message is transmitted to a central control site over the then assigned working channel and, in turn, wherein the central control site responds to the unkeyed message by:
transmitting dotting signals for a first predetermined time period to constitute a drop channel signal to all radio units then residing on the assigned working channel; and
interrupting said drop channel signal and immediately sending an addressed channel assignment confirmation message over the already assigned working channel if requests for further communiques are queued at the control site.

25. Apparatus for achieving reliable and prompt communication within a trunked radio repeater system having a digital control channel and plural working channels, which working channels are assigned for temporary use by individual radio units specified by digital control signals on the control channel, said apparatus comprising:
means for monitoring the control channel for working channel assignments addressed to a predetermined radio unit;
means for shifting said radio unit's operation to an assigned working channel in response to detection of such assignment on the control channel; and
means for simultaneously monitoring the assigned working channel initially upon arrival thereat for a dotting signal of extended duration and for confirmation signals confirming the assignment of that particular channel to said radio unit for a communique.

26. Apparatus as in claim 25 wherein said means for simultaneously monitoring of said assigned working channel includes:
means for shifting radio operations back to the control channel if said extended duration dotting signal is detected;
means for detecting said confirmation signals;
means connected to said detecting means for locking radio operations onto the assigned working channel if said detecting means detects said confirmation signals;
means for providing a muted radio output and for subsequently unmuting said output in response to detection of unmuting signals on the assigned working channel; and
means for monitoring the assigned working channel for subaudible and for unmuting signals upon cessation of said confirmation signals, if any.

27. Apparatus as in claim 25 further comprising:
means for dropping said working channel in response to receipt of channel drop signalling; and
means for ignoring any channel updates to the address and working channel just dropped for a predetermined time period after receipt of drop channel signalling.

28. Apparatus as in claim 25 in which, upon release of a PTT switch at a calling radio, an unkeyed message is transmitted to a central control site over the then assigned working channel and, in turn, wherein the central control site includes means for responding to the unkeyed message comprising:
means for transmitting dotting signals for a first predetermined time period to constitute a drop channel signal to all radio units then residing on the assigned working channel; and
means for interrupting said drop channel signal and immediately sending an addressed channel assignment confirmation message over the already assigned working channel if requests for further communiques are queued at the control site.

29. A method for achieving reliable and prompt communication within a trunked radio repeater system having a digital control channel and plural working channels, which working channels are assigned for temporary use of individual radio units specified by digital control signals on the control channel, said method comprising the steps of:
requesting assignment of a working channel by passing digital request signals from a first radio unit to a control site over said control channel;
assigning a specific working channel to said first radio unit and to at least one second radio unit by passing digital assignment signals over said control channel;
exchanging digital handshake signals over said assigned working channel between said control site and at least one of said radio units; and
releasing said units for communication over said assigned working channel by sending digital release signals on said assigned working channel in response to successful exchange of said handshake signals.

30. A method as in claim 29 wherein said handshake signals are exchanged with said first radio unit.

31. A method as in claim 29 wherein said release signals are sent from said control site.

32. A method as in claim 29 wherein all said digital signals are communicated reliably at substantially 9600 bits per second.

33. A method as in claim 29 wherein said control signals, request signals and handshake signals include triple data redundancy and said assignment signals include six-fold redundancy of data representing the called party and the assigned channel.

34. A method as in claim 29 wherein a certain priority is associated with said working channel assignment and said method further comprises the steps of:
transmitting digital, subaudible new channel assignment updated messages on the assigned working channel, said new channel assignment updated messages having priorities associated therewith; and
monitoring said update messages in each radio unit and responsively dropping off the assigned working channel if the priority associated with a new channel updated message directed to said each radio unit is higher than the certain priority.

35. A method as in claim 34 wherein:

said assigning step includes the step of incrementing a subaudible signalling count value each time said working channel is assigned; and said subaudible message transmitting step includes transmitting said incremented count value within each of said subaudible updated messages, and continually transmitting said subaudible updated messages over said working channel.

36. A method as in claim 34 wherein:

said assigning step includes the step of incrementing a two-bit subaudible signalling count value each time said working channel is assigned; and said subaudible message transmitting step includes the step of transmitting said incremented count value within each of said subaudible updated messages.

37. A method as in claim 29 further comprising the step of:

subsequently transmitting digital channel assignment late entry messages on the control channel to permit the late entry of a called unit specified by said initial digital assignment signals to an ongoing working channel communication.

38. A method as in claim 29 further comprising the steps of:

sending, from the calling unit on the assigned working channel, a digital unkeyed message, and responsive to said unkeyed message, sending, from said control site on said assigned working channel, a digital drop signal which causes all units to drop off the then-assigned working channel thus freeing it for immediate further assignment.

39. A method for achieving reliable and prompt communication within a trunked radio repeater system having a digital control channel and plural working channels, which working channels are assigned for temporary use of individual radio units specified by digital control signals on the control channel, said method comprising the steps of:

requesting assignment of a working channel by passing digital request signals from a first radio unit to a control site over said control channel;

assigning a specific working channel to said first radio unit and to at least one second radio unit by passing digital assignment signals from said control site to said radio units over said control channel;

confirming said assignment by sending digital confirmation signals on said assigned working channel from said control site;

achknowledging successful receipt of said assignment and confirmation signals by at least one of said units, including sending digital acknowledgement signals from said at least one unit to said control site over said assigned working channel in response to said confirmation signals; and releasing at least one of said units for communication by sending digital release signals over said assigned working channel in response to said acknowledgement signals.

40. A method as in claim 39 wherein said acknowledgement signals are sent from said first unit.

41. A method as in claim 39 wherein said release signals are sent from said control site.

42. A method as in claim 41 wherein said second unit is enabled to communicate by receipt of said release signals.

43. A method as in claim 42 wherein said acknowledgement signals are sent from said first unit.

44. A method as in claim 41 wherein said acknowledgement signals are sent from said first unit.

45. A method as in claim 39 wherein said request signals, assignment signals, acknowledgement signals and release signals are all digitally encoded and communicated reliably at substantially 9600 bits per second over said control channel and assigned working channel, respectively.

46. A method as in claim 39 wherein:

said control signals, said request signals and said confirmation signals each include triple data redundancy, and said assignment signals include six-fold redundancy of data representing the called party and the assigned channel.

47. A method as in claim 39 wherein a certain priority is associated with said working channel assignment and said method further comprises the steps of:

transmitting digital, subaudible new channel assignment updated messages on the assigned working channel, said new channel assignment updated messages having priorities associated therewith; and monitoring said update messages in each radio unit and responsively dropping off the assigned working channel if the priority associated with a new channel updated message directed to said each radio unit is higher than the certain priority.

48. A method as in claim 47 wherein:

said assigning step includes the step of incrementing a subaudible signalling count value each time said working channel is assigned; and said subaudible message transmitting step includes transmitting said incremented count value within each of said subaudible updated messages, and continually transmitting said subaudible updated messages over said working channel.

49. A method as in claim 47 wherein:

said assigning step includes the step of incrementing a subaudible signalling count value each time said working channel is assigned; and said subaudible message transmitting step includes transmitting said incremented count value within each of said subaudible updated messages, and continually transmitting said subaudible updated messages over said working channel.

50. A method as in claim 39 further comprising the step of:

subsequently transmitting digital channel assignment late entry messages on the control channel to permit the late entry of a called unit specified by said initial digital assignment signals to an ongoing working channel communication.

51. A method as in claim 39 further comprising the steps of:

sending, from the calling unit on the assigned working channel, a digital unkeyed message, and responsive to said unkeyed message, sending, from said control site on said assigned working channel, a digital drop signal which causes all units to drop off the then-assigned working channel thus freeing it for immediate further assignment.

52. A system of apparatus for achieving reliable and prompt communication within a trunked radio repeater system having a digital control channel and plural working channels, which working channels are assigned for temporary use of individual radio units specified by digital control signals on the control channel, said system comprising:

means for requesting assignment of a working channel by passing digital request signals from a first radio unit to a control site over said control channel;

means for assigning a specific working channel to said first radio unit and to at least one second radio unit by passing digital assignment signals over said control channel;

means for exchanging digital handshake signals over said assigned working channel between said control site and at least one of said radio units; and means for releasing said units for communication over said assigned working channel by sending digital release signals on said assigned working channel in response to successful exchange of said handshake signals.

53. A system as in claim 52 wherein said working channel assignment has a certain priority associated therewith and said system further comprises:

means for transmitting digital, subaudible new channel assignment updated messages on the assigned working channel, said new channel assignment updated messages having priorities associated therewith;

means for monitoring said update messages in each unit, means connected to said monitoring means for detecting the priorities of said monitored update messages, and means connected to said detecting means for responsively dropping off the assigned working channel if the priority associated with a new channel updated message directed to said monitoring means is higher than said certain priority.

54. A system as in claim 53 wherein:

said assigning means includes means for incrementing a subaudible signalling count value each time said working channel is assigned; and said subaudible message transmitting means includes means for transmitting said incremented count value within each of said subaudible updated messages, and means for continually transmitting said subaudible updated messages over said working channel.

55. A system as in claim 53 wherein:

said assigning means includes means for incrementing a two-bit subaudible signalling count value each time said working channel is assigned; and said subaudible message transmitting means includes means for said incremented count value within each of said subaudible updated messages.

56. A system as in claim 52 further comprising:

means for subsequently transmitting digital channel assignment late entry messages on the control channel to permit the late entry of a called unit specified by said initial digital assignment signals to an ongoing working channel communication.

57. A system as in claim 52 further comprising:

means for sending, from the calling unit on the assigned working channel, a digital unkeyed message, and means responsive to said unkeyed message, for sending, from said control site on said assigned working channel, a digital drop signal which causes all units to drop off the then-assigned working channel thus freeing it for immediate further assignment.

58. A system for achieving reliable and prompt communication within a trunked radio repeater system having a digital control channel and plural working channels, which working channels are assigned for temporary use of individual radio units specified by digital control signals on the control channel, said system comprising:

means for requesting assignment of a working channel by passing digital request signals from a first radio unit to a control site over said control channel;

means for assigning a specific working channel to said first radio unit and to at least one second radio unit by passing digital assignment signals from said control site to said radio units over said control channel;

means for confirming said assignment by sending digital confirmation signals on said assigned working channel from said control site;

means for acknowledging successful receipt of said assignment and confirmation signals by at least one of said units, including means for sending digital acknowledgement signals from said at least one unit to said control site over said assigned working channel in response to said confirmation signals; and means for releasing at least one of said units for communication by sending digital release signals over said assigned working channel in response to said acknowledgement signals.

59. A system as in claim 58 wherein said request signals, assignment signals, acknowledgement signals and release signals are all digitally encoded and communicated reliably at substantially 9600 bps over said control channel and assigned working channel, respectively.

60. A system as in claim 58 wherein:

said control signals, said request signals and said confirmation signals each include triple data redundancy, and said assignment signals include six-fold redundancy of data representing the called party and the assigned channel.

61. A method for achieving reliable and prompt communication within a trunked radio repeater system having a digital control channel and plural working channels, which working channels are assigned for temporary use of individual radio units specified by digital control signals on the control channel, said method comprising the steps of:

requesting assignment of a working channel;

monitoring for digital working channel assignment signals over said control channel issued in response to said requested assignment;

exchanging digital handshake signals over said assigned working channel between said control site and said radio units; and releasing said assigned working channel for communication over by sending digital release signals on said assigned working channel in response to successful exchange of said handshake signals.

62. A method as in claim 61 wherein said release signals are sent from said control site.

63. A method as in claim 61 wherein all said digital signals are communicated reliably at substantially 9600 bits per second.

64. A method as in claim 61 wherein said control signals, request signals and handshake signals include triple data redundancy and said assignment signals include six-fold redundancy of data representing the called party and the assigned channel.

65. A method as in claim 61 wherein said working channel assignment has a certain priority associated therewith and said system further comprises the steps of:

transmitting digital, subaudible new channel and assignment updated messages on the assigned working channel, said new channel assignment updated messages having priorities associated therewith;

monitoring said update messages in each radio unit; and responsively dropping off the assigned working channel if the priority associated with a new channel updated message directed to said monitoring means is higher than said certain priority.

66. A method as in claim 65 wherein:

said assigning step includes the step of incrementing a subaudible signalling count value each time said working channel is assigned; and said subaudible message transmitting step includes transmitting said incremented count value within each of said subaudible updated messages, and continually transmitting said subaudible updated messages over said working channel.

67. A method as in claim 65 wherein:

said assigning step includes the step of incrementing a subaudible signalling count value each time said working channel is assigned; and said subaudible message transmitting step includes transmitting said incremented count value within each of said subaudible updated messages, and continually transmitting said subaudible updated messages over said working channel.

68. A method as in claim 61 further comprising the step of:

subsequently transmitting digital channel assignment late entry messages on the control channel to permit the late entry of a called unit specified by said initial digital assignment signals to an ongoing working channel communication.

69. A system of apparatus for achieving reliable and prompt communication within a trunked radio repeater system having a digital control channel and plural working channels, which working channels are assigned for temporary use of individual radio units specified by digital control signals on the control channel, said system comprising:

means for requesting assignment of a working channel;

means for assigning a specific working channel to radio unit by passing digital assignment signals over said control channel;

means for exchanging digital handshake signals over said assigned working channel between said control site and at least one of said radio units; and means for releasing said assigned working channel for communication thereover by sending digital release signals on said assigned working channel in response to successful exchange of said handshake signals.

70. A system as in claim 69 wherein said working channel assignment has a certain priority associated therewith and said system further comprises:

means for transmitting digital, subaudible new channel assignment updated messages on the assigned working channel, said new channel assignment updated messages having priorities associated therewith;

means for monitoring said update messages in each unit;

means connected to said monitoring means for detecting the priorities of said monitored update messages; and means connected to said detecting means for responsively dropping off the assigned working channel if the priority associated with a new channel updated message directed to said monitoring means is higher than said certain priority.

71. A system as in claim 70 wherein:

said assigning means includes means for incrementing a subaudible signalling count value each time said working channel is assigned; and said subaudible message transmitting means includes means for transmitting said incremented count value within each of said subaudible updated messages, and means for continually transmitting said subaudible updated messages over said working channel.

72. A system as in claim 70 wherein:

said assigning means includes means for incrementing a subaudible signalling count value each time said working channel is assigned; and said subaudible message transmitting means includes means for transmitting said incremented count value within each of said subaudible updated messages, and means for continually transmitting said subaudible updated messages over said working channel.

73. A method as in claim 69 further comprising the step of:

subsequently transmitting digital channel assignment late entry messages on the control channel to permit the late entry of a called unit specified by said initial digital assignment signals to an ongoing working channel communication.

74. A system as in claim 69 further comprising:

means for sending, from the calling unit on the assigned working channel, a digital unkeyed message, and means for responsive to said unkeyed message, for sending, from said control site on said assigned working channel, a digital drop signal which causes all units to drop off the then-assigned working channel thus freeing it for immediate further assignment.

75. A radio unit for achieving reliable and prompt communication within a trunked radio repeater system having a digital control channel and plural working channels, which working channels are assigned for temporary use of individual radio units specified by digital control signals on the control channel, said radio unit comprising:

means for requesting assignment of a working channel by passing digital request signals to a control site over said control channel;

means for detecting digital working channel assignment signals over said control channel;

means for exchanging digital handshake signals with said control site over said assigned working channel, and means for detecting digital release signals on said assigned working channel after successful exchange of said handshake signals and for unmuting communication over the assigned working channel in response to said detected release signals.

76. A system as in claim 75 wherein said working channel assignment has a certain priority associated therewith and said system further comprises:
means for transmitting digital, subaudible new channel assignment updated messages on the assigned working channel, said new channel assignment updated messages having priorities associated therewith;
means for monitoring said update messages in each unit,
means connected to said monitoring means for detecting the priorities of said monitored update messages, and
means connected to said detecting means for responsively dropping off the assigned working channel if the priority associated with a new channel updated message directed to said monitoring means is higher than said certain priority.

77. A system as in claim 76 wherein:
said assigning means includes means for incrementing a subaudible signalling count value each time said working channel is assigned; and
said subaudible message transmitting means includes means for transmitting said incremented count value within each of said subaudible updated messages, and means for continually transmitting said subaudible updated messages over said working channel.

78. A system as in claim 76 wherein:
said assigning means includes means for incrementing a subaudible signalling count value each time said working channel is assigned; and
said subaudible message transmitting means includes means for transmitting said incremented count value within each of said subaudible updated messages, and means for continually transmitting said subaudible updated messages over said working channel.

79. A radio unit as in claim 75 further comprising:
means for detecting digital channel assignment late entry messages on the control channel to permit the late entry of a called unit to an ongoing working channel communication it was earlier directed to.

80. A system as in claim 75 further comprising:
means for sending, from the calling unit on the assigned working channel, a digital unkeyed message in response to release of a PTT switch, and
means responsive to a digital drop signal received on the assigned working channel for dropping off the then-assigned working channel thus freeing it for immediate further assignment.

81. A method for achieving reliable and prompt communication within a trunked radio repeater system having a digital control channel and plural working channels, which working channels are assigned for temporary use of individual radio units specified by digital control signals on the control channel, said method comprising the step of:
transmitting, with channel assignment signals on at least one of said control channel or an assigned working channel, a trunked status signal identifying whether the usage of the working channel is to be transmission or message trunked.

82. Apparatus for achieving reliable and prompt communication within a trunked radio repeater system having a digital control channel and plural working channels, which working channels are assigned for temporary use of individual radio units specified by digital control signals on the control channel, said apparatus comprising:
transceiver means at a central site for transmitting and receiving radio frequency signals over said control channel and over said working channels; and
means for transmitting with channel assignment signals on at least one of said control channel or an assigned working channel, a trunked status signal identifying whether the usage of the working channel is to be transmission or message trunked.

* * * * *